(12) United States Patent
Cheng et al.

(10) Patent No.: US 9,781,707 B2
(45) Date of Patent: Oct. 3, 2017

(54) METHOD, DEVICE, AND SYSTEM FOR TRANSMITTING UPLINK CONTROL INFORMATION

(71) Applicant: Huawei Technologies Co., Ltd., Shenzhen, Guangdong (CN)

(72) Inventors: Yan Cheng, Beijing (CN); Bo Li, Beijing (CN); Xiaobo Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 514 days.

(21) Appl. No.: 14/487,672

(22) Filed: Sep. 16, 2014

(65) Prior Publication Data
US 2015/0003390 A1    Jan. 1, 2015

Related U.S. Application Data

(63) Continuation of application No. PCT/CN2013/072653, filed on Mar. 15, 2013.

(30) Foreign Application Priority Data

Mar. 16, 2012    (CN) .......................... 2012 1 0071432

(51) Int. Cl.
    *H04W 72/04*    (2009.01)
    *H04L 1/00*    (2006.01)
    (Continued)

(52) U.S. Cl.
    CPC ....... *H04W 72/0413* (2013.01); *H04L 1/0073* (2013.01); *H04L 1/0026* (2013.01); (Continued)

(58) Field of Classification Search
    None
    See application file for complete search history.

(56) References Cited

U.S. PATENT DOCUMENTS

| 9,106,398 B2* | 8/2015 | Jang | ...................... H04L 1/0042 |
| 2011/0080880 A1* | 4/2011 | Yin | ...................... H04B 7/0682 370/329 |

(Continued)

FOREIGN PATENT DOCUMENTS

| CN | 1232322 A | 7/2008 |
| CN | 101232322 A | 7/2008 |

(Continued)

OTHER PUBLICATIONS

"Multiplexing of periodic CSI and ACK/NACK on PUCCH," 3GPP TSG RAN WG1 Meeting #63bis, Dublin, Ireland, R1-110164, $3^{rd}$ Generation Partnership Project, Valbonne, France (Jan. 17-21, 2011).

(Continued)

*Primary Examiner* — Chirag Shah
*Assistant Examiner* — Srinivasa Reddivalam
(74) *Attorney, Agent, or Firm* — Leydig, Voit & Mayer, Ltd.

(57) ABSTRACT

The present invention discloses a method, a device, and a system for transmitting uplink control information, and relates to the communications field. The method includes: encoding uplink control information to acquire a coded bit sequence of the uplink control information, where the uplink control information includes first uplink control information and second uplink control information; and transmitting the coded bit sequence of the uplink control information to a base station through a physical uplink channel. The system includes a user equipment and a base station. By encoding uplink control information to acquire a coded bit sequence of the uplink control information and transmitting, through a physical uplink channel, the coded bit sequence to a base station, the present invention supports simultaneous transmission of first uplink control information and second uplink (Continued)

control information and improves transmission performance.

2 Claims, 9 Drawing Sheets

(51) Int. Cl.
*H04L 1/16* (2006.01)
*H04L 5/00* (2006.01)

(52) U.S. Cl.
CPC .......... *H04L 1/0031* (2013.01); *H04L 1/1671* (2013.01); *H04L 5/0055* (2013.01)

(56) References Cited

U.S. PATENT DOCUMENTS

| | | | |
|---|---|---|---|
| 2012/0033587 A1* | 2/2012 | Papasakellariou | H04J 13/00 370/277 |
| 2012/0134306 A1 | 5/2012 | Cheng et al. | |
| 2012/0213187 A1 | 8/2012 | Yang et al. | |
| 2014/0092846 A1 | 4/2014 | Cheng et al. | |

FOREIGN PATENT DOCUMENTS

| | | | | |
|---|---|---|---|---|
| CN | WO 2011/147382 A1 * | 6/2011 | ........... | H04L 1/0042 |
| CN | 102377535 A | 3/2012 | | |
| CN | 102468917 A | 5/2012 | | |
| EP | 2763482 A1 | 8/2014 | | |
| WO | WO 2011052961 A2 | 5/2011 | | |
| WO | WO 2011147382 A1 | 12/2011 | | |

OTHER PUBLICATIONS

"Multiplexing CSI and A/N using PUCCH F3," 3GPP TSG RAN WG1 Meeting #66bis Zhuhai, China, R1-113218, 3$^{rd}$ Generation Partnership Project, Valbonne, France (Oct. 10-14, 2011).
"Coding and resource mapping for UCI on PUSCH," 3GPP TSG RAN WG1 Meeting #63bis, Dublin, Ireland, R1-110009, 3$^{rd}$ Generation Partnership Project, Valbonne, France (Jan. 17-21, 2011).
"Simultaneous transmission of periodic CSI and HARQ-ACK," 3GPP TSG RAN WG1 Meeting #68, Dresden, Germany, R1-120012, 3$^{rd}$ Generation Partnership Project, Valbonne, France (Feb. 6-10, 2012).
"On encoding for HARQ-ACK and Periodic CSI Multiplexing in PUCCH Format 3," 3GPP TSG RAN WG1 Meeting #68, Dresden, Germany, R1-120367, 3$^{rd}$ Generation Partnership Project, Valbonne, France (Feb. 6-10, 2012).

* cited by examiner

METHOD, DEVICE, AND SYSTEM FOR TRANSMITTING UPLINK CONTROL INFORMATION

CROSS-REFERENCE TO RELATED APPLICATION

This application is a continuation of International Patent Application No. PCT/CN2013/072653, filed on Mar. 15, 2013, which claims priority to Chinese Patent Application 201210071432.2, filed on Mar. 16, 2012, both of which are hereby incorporated by reference in their entireties.

TECHNICAL FIELD

The embodiments of the present invention relate to the communications field, and in particular, to a method, a device, and a system for transmitting uplink control information.

BACKGROUND

To meet a peak data rate requirement of the International Telecommunication Union for fourth-generation communications technologies, a CA (carrier aggregation) technology is introduced to an LTE-A (Long Term Evolution-Advanced) system. In addition, in order to support technologies such as downlink MIMO (multiple input multiple output) transmission and hybrid automatic repeat, a terminal needs to feed UCI (uplink control information) back to a base station. The UCI includes CSI (channel state information), HARQ (hybrid automatic repeat request), and like information.

In the prior art, when feeding UCI back to a base station, if a terminal simultaneously accesses multiple downlink member carriers to receive downlink data, the terminal needs to feed back, in an uplink direction, CSI of each downlink member carrier with respect to each downlink member carrier, and HARQ information of each downlink member carrier with respect to data scheduled on each downlink member carrier.

The base station semi-statically configures, through high layer signaling and for periodic CSI of each carrier, a reporting mode, a reporting cycle and a subframe offset. A user equipment determines, according to the reporting mode indicated in the high layer signaling, a reporting type corresponding to CSI to be reported, and determines, according to the reporting cycle and the subframe offset indicated in the high layer signaling, a reporting moment of the CSI of each reporting type. The user equipment, if detecting a physical downlink control channel PDSCH (physical downlink shared channel) transmission or a PDCCH (physical downlink control channel) used to indicate release of semi-persistent scheduling, needs to feed back an HARQ-ACK (acknowledgment). Therefore, in an LTE-A carrier aggregation scenario, the channel state information and the hybrid automatic repeat acknowledgment information need to be reported on one uplink subframe at the same time, where the channel state information to be reported may correspond to one or more downlink carriers and the hybrid automatic repeat acknowledgment information to be reported may also correspond to one or more downlink carriers. In a carrier aggregation scenario, how simultaneous transmission of the periodic CSI and the hybrid automatic repeat acknowledgment information can be supported is an issue to be solved.

SUMMARY

To realize simultaneous transmission of multiple types of uplink control information and improve transmission performance, embodiments of the present invention provide a method, a device, and a system for transmitting uplink control information. The technical solutions are as follows:

In one aspect, a method for transmitting uplink control information is provided, where the method includes:

encoding uplink control information to acquire a coded bit sequence of the uplink control information, where the uplink control information includes first uplink control information and second uplink control information; and transmitting the coded bit sequence of the uplink control information to a base station through a physical uplink channel.

A user equipment is further provided, where the user equipment includes:

an encoding module, configured to encode uplink control information to acquire a coded bit sequence of the uplink control information, where the uplink control information includes first uplink control information and second uplink control information; and a transmitting module, configured to transmit the coded bit sequence, which is acquired by the encoding module, of the uplink control information, to a base station through a physical uplink channel.

In another aspect, a method for transmitting uplink control information is further provided, where the method includes:

receiving a signal transmitted on a physical uplink channel, where the physical uplink channel is used to transmit uplink control information, where the uplink control information includes first uplink control information and second uplink control information; and detecting, according to the signal transmitted on the physical uplink channel, the uplink control information.

A base station is further provided, where the base station includes:

a receiving module, configured to receive a signal transmitted on a physical uplink channel, where the physical uplink channel is used to transmit uplink control information, where the uplink control information includes first uplink control information and second uplink control information; and a detecting module, configured to detect, according to the signal transmitted on the physical uplink channel, the uplink control information.

In still another aspect, a transmission control system of uplink control information is further provided, where the system includes a user equipment and a base station, where the user equipment is the foregoing user equipment and the base station is the foregoing base station.

The technical solution provided by embodiments of the present invention brings the following beneficial effects:

By encoding uplink control information to acquire a coded bit sequence of the uplink control information and transmitting, through a physical uplink channel, the coded bit sequence to a base station, first uplink control information and second uplink control information can be simultaneously transmitted and transmission performance is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following describes implementation manners of the present invention in detail with reference to the accompanying drawings.

Embodiment 1

Figure 1:
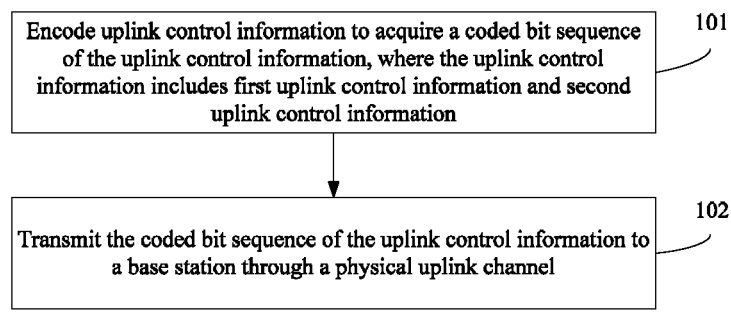
FIG. 1 is a flowchart of a method for transmitting uplink control information according to Embodiment 1 of the present invention.

This embodiment provides a method for transmitting uplink control information. From the view of a user equipment, as shown in FIG. 1, a process of the method provided by the embodiment is specifically as follows:

101: Encode uplink control information to acquire a coded bit sequence of the uplink control information, where the uplink control information includes first uplink control information and second uplink control information.

102: Transmit the coded bit sequence of the uplink control information to a base station through a physical uplink channel.

Figure 2:
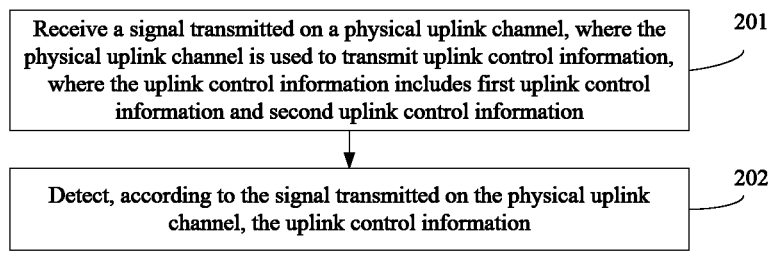
FIG. 2 is a flowchart of another method for transmitting uplink control information according to Embodiment 1 of the present invention.

From the view of a base station, as shown in FIG. 2, a process of the method provided by the embodiment is specifically as follows:

201. Receive a signal transmitted on a physical uplink channel, where the physical uplink channel is used to transmit uplink control information, where the uplink control information includes first uplink control information and second uplink control information.

202: Detect, according to the signal transmitted on the physical uplink channel, the uplink control information.

By encoding uplink control information to acquire a coded bit sequence of the uplink control information and transmitting, through a physical uplink channel, the coded bit sequence to a base station, the method provided by the embodiment of the present invention supports simultaneous transmission of first uplink control information and second uplink control information and improves transmission performance.

To more clearly describe the method for transmitting uplink control information according to the foregoing Embodiment 1, the following Embodiments 2 to 5 are used as examples to explain the method for transmitting uplink control information in detail. Details are provided in the following embodiments.

Embodiment 2

Figure 3:
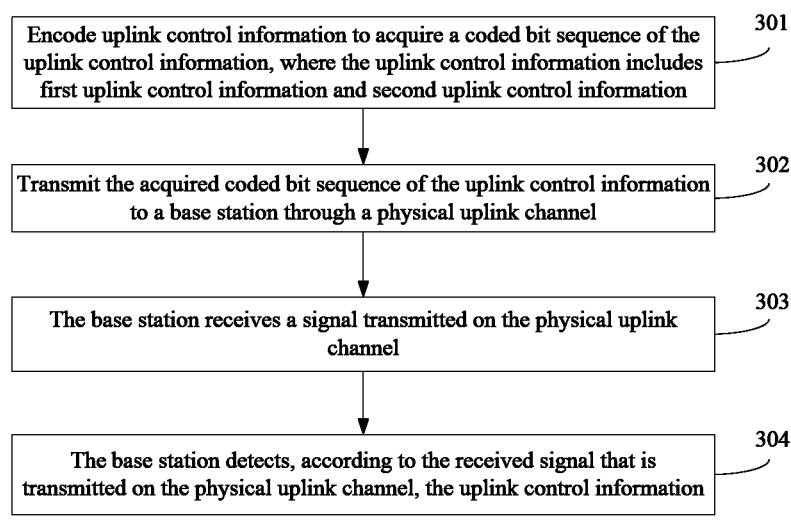
FIG. 3 is a flowchart of a method for transmitting uplink control information according to Embodiment 2 of the present invention.

This embodiment provides a method for transmitting uplink control information, where the uplink control information transmitted in the method includes first uplink control information and second uplink control information. The first uplink control information may be CSI, and the second uplink control information may be an HARQ-ACK or the second uplink control information may be an HARQ-ACK and an SR (scheduling request). The embodiment poses no specific limitation thereon. As shown in FIG. 3, a process of the method provided by the embodiment is specifically as follows:

301: Encode uplink control information to acquire a coded bit sequence of the uplink control information, where the uplink control information includes first uplink control information and second uplink control information.

Specifically, this step may be implemented through the following steps:

Step 31: Respectively acquire resources occupied by the first uplink control information and the second uplink control information on a physical uplink channel.

The resources occupied by the first uplink control information and the second uplink control information on the physical uplink channel may be numbers of modulation symbols or numbers of coded bits. That is, this step may be acquiring the number of modulation symbols occupied by the first uplink control information and the number of modulation symbols occupied by the second uplink control information or may be acquiring the number of coded bits occupied by the first uplink control information and the number of coded bits occupied by the second uplink control information, and the embodiment poses no specific limitation thereon.

Step 32: Perform, according to the resources occupied by the first uplink control information, channel coding on the first uplink control information to acquire a coded bit sequence of the first uplink control information, and perform, according to the resources occupied by the second uplink control information, channel coding on the second uplink control information to acquire a coded bit sequence of the second uplink control information.

Specifically, if the resources acquired in the foregoing step 31 are numbers of modulation symbols, this step may be first calculating the number of coded bits of the first uplink control information and the number of coded bits of the second uplink control information according to the number of modulation symbols occupied by the first uplink control information and the number of modulation symbols occupied by the second uplink control information respectively, specifically, acquiring the corresponding number of coded bits by multiplying the number of modulation symbols and a modulation order of the uplink control information, and then performing, according to the number of coded bits of the first uplink control information and the number of coded bits of the second uplink control information, channel coding to acquire the coded bit sequence $q_0^{UCI1}$, $q_1^{UCI1}$, $q_2^{UCI1}$, ..., $q_{Q_{UCI1}-1}^{UCI1}$ of the first link control information and the coded bit sequence $q_0^{UCI2}$, $q_1^{UCI2}$, $q_2^{UCI2}$, ..., $q_{Q_{UCI2}-1}^{UCI2}$ of the second uplink control information respectively.

If the resources acquired in the foregoing step 31 are numbers of coded bits, this step may be directly performing, according to the acquired number of coded bits of the first uplink control information, channel coding on the first uplink control information and performing, according to the acquired number of coded bits of the second uplink control information, channel coding on the second uplink control information, to acquire the coded bit sequence $q_0^{UCI1}$, $q_1^{UCI1}$, $q_2^{UCI1}$, ..., $q_{Q_{UCI1}-1}^{UCI1}$ first uplink control information and the coded bit sequence $q_0^{UCI2}$, $q_1^{UCI2}$, $q_2^{UCI2}$, ..., $q_{Q_{UCI2}-1}^{UCI2}$ of the second uplink control information.

No matter whether the acquired resources are numbers of modulation symbols or numbers of coded bits, the channel coding method in this step may be as follows: performing independent channel coding on the first uplink control information and the second uplink control information. Specifically, a (32, O) code may be used to separately encode the first uplink control information and the second uplink control information. In this encoding manner, information bits that can be transmitted in the first uplink control information are at most 11 bits, and information bits that can be transmitted in the second uplink control information are also at most 11 bits.

Step 33: Concatenate the acquired coded bit sequence of the first uplink control information and the acquired coded bit sequence of the second uplink control information to acquire a coded bit sequence of the uplink control information.

Specifically, for example, it is assumed that the coded bit sequence of the first uplink control information is $q_0^{UCI1}$, $q_1^{UCI1}$, $q_2^{UCI1}$, ..., $q_{Q_{UCI1}-1}^{UCI1}$, that the coded bit sequence of the second uplink control information is $q_0^{UCI2}$, $q_1^{UCI2}$, $q_2^{UCI2}$, ..., $q_{Q_{UCI2}-1}^{UCI2}$, and that the acquired coded bit sequence of the uplink control information is $b(0)$, ..., $b(Q_{UCI1}+Q_{UCI2}-1)$. This step may be implemented by using one of the following three manners:

Manner 1:

Step a11: Divide the coded bit sequence of the first uplink control information into a first part of the coded bit sequence of the first uplink control information and a second part of the coded bit sequence of the first uplink control information, and divide the coded bit sequence of the second uplink control information into a first part of the coded bit sequence of the second uplink control information and a second part of the coded bit sequence of the second uplink control information.

Step a12: Concatenate the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information.

In this step, after coded bits in the coded bit sequence of the first uplink control information and coded bits in the coded bit sequence of the second uplink control information are combined, time and frequency resources occupied by the coded bits of the first uplink control information are upward extended from bottom of time and frequency resources of each timeslot and time and frequency resources occupied by the coded bits of the second uplink control information are downward extended from top of the time and frequency resources of each timeslot. When a timing deviation occurs, a signal at the bottom of the time and frequency resources is polluted. In this case, mapping the second uplink control information to the top of the time and frequency resources can further protect the second uplink control information. Because it is assumed in this embodiment that the second uplink control information includes hybrid automatic repeat acknowledgment information HARQ-ACK and the first uplink control information is CSI, and because the HARQ-ACK has a higher performance requirement than the CSI, the method provided by the embodiment can further protect uplink control information with a higher priority.

Next, for example, it is assumed that the first uplink control information is periodic CSI and the second uplink control information is the hybrid automatic repeat acknowledgment information HARQ-ACK. In this manner, an encoding mode is specifically as follows:

dividing a coded bit sequence $q_0^{CSI}$, $q_1^{CSI}$, $q_2^{CSI}$, ..., $q_{Q_{CSI}-1}^{CSI}$ of the periodic CSI into a first part of the coded bit sequence $$q_0^{CSI}, q_1^{CSI}, q_2^{CSI}, \ldots, q_{\lceil (Q_{CSI}/2)/2 \rceil *2-1}^{CSI}$$

of the CSI and a second part of the coded bit sequence $$q_{\lceil (Q_{CSI}/2)/2 \rceil *2}^{CSI}, q_{\lceil (Q_{CSI}/2)/2 \rceil *2+1}^{CSI}, \ldots, q_{Q_{CSI}-1}^{CSI}$$

of the CSI, and dividing a coded bit sequence $q_0^{ACK}$, $q_1^{ACK}$, $q_2^{ACK}$, ..., $q_{Q_{ACK}-1}^{ACK}$ of the HARQ-ACK into a first part of the coded bit sequence $$q_0^{ACK}, q_1^{ACK}, q_2^{ACK}, \ldots, q_{(12-\lceil (Q_{CSI}/2)/2 \rceil)*2-1}^{ACK}$$

of the HARQ-ACK and a second part of the coded bit sequence $$q^{ACK}_{(12-\lceil \frac{(Q_{CSI}/2)}{2}\rceil)*2}, q^{ACK}_{(12-\lceil \frac{(Q_{CSI}/2)}{2}\rceil)*2+1}, \cdots, q^{ACK}_{Q_{ACK}-1}$$

of the HARQ-ACK; and concatenating the first part of the coded bit sequence of the CSI, the first part of the coded bit sequence of the HARQ-ACK, the second part of the coded bit sequence of the CSI, and the second part of the coded bit sequence of the HARQ-ACK in sequence to acquire the coded bit sequence of the uplink control information, where $Q_{CSI}$ is the number of coded bits occupied by the periodic CSI and $Q_{ACK}$ is the number of coded bits occupied by the hybrid automatic repeat acknowledgment information HARQ-ACK.

The first part of the coded bit sequence of the HARQ-ACK may also be $$q^{ACK}_0, q^{ACK}_1, q^{ACK}_2, \cdots, q^{ACK}_{(\lceil \frac{(Q_{ACK}/2)}{2}\rceil)*2-1}$$

and the second part of the coded bit sequence of the HARQ-ACK is $$q^{ACK}_{(\lceil \frac{(Q_{ACK}/2)}{2}\rceil)*2}, q^{ACK}_{(\lceil \frac{(Q_{ACK}/2)}{2}\rceil)*2+1}, \cdots, q^{ACK}_{Q_{ACK}-1}.$$

The first part of the coded bit sequence of the CSI includes $$\lceil \frac{(Q_{CSI}/2)}{2}\rceil *2$$

coded bits and the second part of the coded bit sequence of the CSI includes $$\lfloor \frac{(Q_{SCI}/2)}{2}\rfloor *2 \text{ or } Q_{CSI}-\lceil \frac{(Q_{CSI}/2)}{2}\rceil *2$$

coded bits. The first part of the coded bit sequence of the HARQ-ACK includes $$\left(12-\lceil \frac{(Q_{CSI}/2)}{2}\rceil\right)*2 \text{ or } \left(\lceil \frac{(Q_{ACK}/2)}{2}\rceil\right)*2$$

coded bits and the second part of the coded bit sequence of the HARQ-ACK includes $$\left(12-\lfloor \frac{(Q_{CSI}/2)}{2}\rfloor\right)*2 \text{ or } Q_{ACK}-\left(\lceil \frac{(Q_{ACK}/2)}{2}\rceil\right)*2$$

coded bits.

Figure 4:
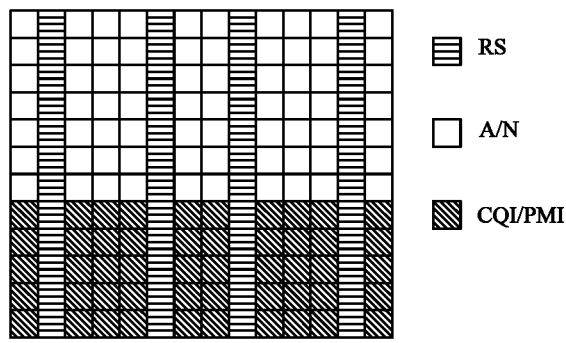
FIG. 4 is a schematic diagram illustrating resource mapping of uplink control information according to Embodiment 2 of the present invention.

Furthermore, the foregoing step may specifically be implemented by using the following pseudo code:

Set i = 0 while $i < \lceil \frac{(Q_{CSI}/2)}{2}\rceil *2$ b(i) = $q^{CSI}_i$
i = i +1
end while
Set i = 0 while $i < \left(12 - \lceil \frac{(Q_{CSI}/2)}{2}\rceil\right)*2$ $b\left(i + \lceil \frac{(Q_{CSI}/2)}{2}\rceil *2\right) = q^{ACK}_i$ i = i + 1
end while
Set i = 0 while $i < \left(Q_{CSI} - \lceil \frac{(Q_{CSI}/2)}{2}\rceil *2\right)$ $b(i + 24) = q^{CSI}_{i+\lceil \frac{(Q_{CSI}/2)}{2}\rceil *2}$ i = i +1
end while
Set i = 0 while $i < \left(24 - Q_{CSI} + \lceil \frac{(Q_{CSI}/2)}{2}\rceil *2\right)$ $b\left(i + 24 + \left(Q_{CSI} - \lceil \frac{(Q_{CSI}/2)}{2}\rceil *2\right)\right) = q^{ACK}_{i+(12-\lceil \frac{(Q_{CSI}/2)}{2}\rceil)*2}$ i = i +1
end while In this manner, time and frequency resources occupied by the coded bits of the hybrid automatic repeat acknowledgment information and time and frequency resources occupied by the coded bits of the periodic CSI are shown in FIG. 4. As shown in FIG. 4, the periodic CSI and the hybrid automatic repeat acknowledgment information HARQ-ACK are both distributed on time and frequency resources of two timeslots on a physical uplink control channel, which enables both the periodic CSI and the hybrid automatic repeat acknowledgment information HARQ-ACK to acquire better time and frequency diversity gains and thereby better ensures performance of the periodic CSI and the HARQ-ACK.

Manner 2:

Step a21: Concatenate the coded bit sequence of the first uplink control information and the coded bit sequence of the second uplink control information in sequence, that is, attach the coded bit sequence of the second uplink control information to the end of the coded bit sequence of the first uplink control information, to acquire a concatenated coded bit sequence; or concatenate the coded bit sequence of the second uplink control information and the coded bit sequence of the first uplink control information in sequence, that is, attach the coded bit sequence of the first uplink control information to the end of the coded bit sequence of the second uplink control information, to acquire a concatenated coded bit sequence.

Step a22: Select, based on a granularity of $Q_m$ coded bits, coded bits from the concatenated coded bit sequence to acquire the coded bit sequence of the uplink control information.

Where, $Q_m$ is a modulation order of the uplink control information. During the selection of coded bits, all coded bits selected at even selections are arranged in front of all coded bits selected at odd selections to acquire the coded bit sequence of the uplink control information. If the numbering of selections begins with 0, in the embodiment, the first selection is determined as an even selection, the second selection is determined as an odd selection, and so on.

It should be noted that, in this manner, if the coded bit sequence of the second uplink control information is attached to the end of the coded bit sequence of the first uplink control information, time and frequency resources occupied by the coded bits of the first uplink control information are upward extended from the bottom of time and frequency resources of each timeslot and time and frequency resources occupied by the coded bits of the second uplink control information are downward extended from the top of the time and frequency resources of each timeslot. As shown in FIG. 4, RS (Reference Signal) stands for reference signal, A/N stands for ACK/NACK (Negative Acknowledgement, negative acknowledgment), CQI (Channel Quality Indicator) stands for channel quality indicator, and PMI (Precoding Matrix Indicator) stands for precoding matrix indicator. If the coded bit sequence of the first uplink control information is attached to the end of the coded bit sequence of the second uplink control information, the time and frequency resources occupied by the coded bits of the second uplink control information are upward extended from the bottom of the time and frequency resources of each timeslot and the time and frequency resources occupied by the coded bits of the first uplink control information are downward extended from the top of the time and frequency resources of each timeslot.

Manner 3:

The coded bit sequence of the first uplink control information and the coded bit sequence of the second uplink control information are concatenated in sequence, that is, the coded bit sequence of the second uplink control information is attached to the end of the coded bit sequence of the first uplink control information to acquire the coded bit sequence of the uplink control information; or the coded bit sequence of the second uplink control information and the coded bit sequence of the first uplink control information are concatenated in sequence, that is, the coded bit sequence of the first uplink control information is attached to the end of the coded bit sequence of the second uplink control information to acquire the coded bit sequence of the uplink control information.

302: Transmit the acquired coded bit sequence to a base station through a physical uplink channel.

Specifically, a physical uplink control channel in this step may be physical uplink control channel format 3 (PUCCH format 3). In addition, when manner 1 or manner 2 is used to combine the acquired coded bit sequence of the first uplink control information and the acquired coded bit sequence of the second uplink control information to acquire the coded bit sequence of the uplink control information in the foregoing step 33, a manner for transmitting the acquired coded bit sequence in step 302 may be as follows:

scrambling and modulating coded bits in the coded bit sequence of the uplink control information to acquire a group of complex-valued modulation symbols; using an orthogonal sequence to perform spectrum spreading on the acquired complex-valued modulation symbols to acquire spectrum-spread complex-valued modulation symbols; and mapping the spectrum-spread complex-valued modulation symbols to the physical uplink control channel for transmission to the base station.

When manner 3 is used to combine the acquired coded bit sequence of the first uplink control information and the acquired coded bit sequence of the second uplink control information to acquire the coded bit sequence of the uplink control information in the foregoing step 33, a manner for transmitting the acquired coded bit sequence in step 302 is as follows:

Step b1: Scramble coded bits in the bit sequence of the uplink control information and then modulate the scrambled coded bits to acquire a group (or a block) of complex-valued modulation symbols (a block of complex-valued modulation symbols). For example, when the physical uplink control channel is PUCCH format 3, the acquired coded bit sequence $b(0)$, $b(1)$, . . . , $b(47)$ of the uplink control information is first scrambled and then QPSK (quadrature phase shift keying) modulation is performed on the scrambled coded bits to acquire 24 complex-valued modulation symbols $d(0)$, . . . , $d(23)$.

Step b2: Map complex-valued modulation symbols in even positions and complex-valued modulation symbols in odd positions in the acquired group of complex-valued modulation symbols to the time and frequency resources of the two timeslots on the physical uplink control channel respectively for transmission to the base station, so that the first uplink control information and the second uplink control information are both distributed on the time and frequency resources of the two timeslots on the physical uplink control channel.

For example, the complex-valued modulation symbols in even positions may be mapped to time and frequency resources of a first timeslot on the physical uplink control channel and the complex-valued modulation symbols in odd positions to time and frequency resources of a second timeslot on the physical uplink control channel. In the acquired group of complex-valued modulation symbols, the first complex-valued modulation symbol is a modulation symbol in an even position, the second complex-valued modulation symbol is a modulation symbol in an odd position, and so on. This step may specifically be implemented according to one of the following two manners:

Manner 1:

Step b21: Interleave the acquired group of complex-valued modulation symbols.

For example, when the physical uplink control channel is PUCCH format 3, the 24 complex-valued modulation symbols acquired in step b1 are interleaved, so that, in the interleaved 24 complex-valued modulation symbols, complex-valued modulation symbols in even positions are arranged in front of complex-valued modulation symbols in odd positions to acquire an interleaved group of complex-valued modulation symbols. An interleaving method may be as follows: extracting the complex-valued modulation symbols in even positions and the complex-valued modulation symbols in odd positions from the 24 complex-valued modulation symbols, and attaching the complex-valued modulation symbols in odd positions to the end of the complex-valued modulation symbols in even positions to acquire the interleaved group of complex-valued modulation symbols. It should be noted that, in the 24 complex-valued modulation symbols acquired in step b1, the first complex-valued modulation symbol is a modulation symbol in an even position, the second complex-valued modulation symbol is a modulation symbol in an odd position, and so on.

Step b22: Map the interleaved group of complex-valued modulation symbols to the physical uplink channel for transmission to the base station.

For example, the orthogonal sequence is used to perform spectrum spreading on the interleaved complex-valued modulation symbols to acquire spectrum-spread complex-valued modulation symbols; and the spectrum-spread complex-valued modulation symbols are mapped to the physical uplink control channel for transmission to the base station. An orthogonal sequence of the first timeslot is used to perform spectrum spreading on the first 12 modulation symbols in the interleaved complex-valued symbols and the spectrum-spread complex-valued symbols are mapped to the time and frequency resources of the first timeslot on the physical uplink control channel. An orthogonal sequence of the second timeslot is used to perform spectrum spreading on the last 12 modulation symbols in the interleaved complex-valued symbols and the spectrum-spread complex-valued symbols are mapped to the time and frequency resources of the second timeslot on the physical uplink control channel.

Manner 2:

Spectrum spreading is performed on the acquired group of complex-valued modulation symbols and the spectrum-spread complex-valued modulation symbols are mapped to the physical uplink control channel for transmission to the base station.

During specific implementation of this manner, an orthogonal sequence of the first timeslot is used to perform spectrum spreading on the complex-valued modulation symbols in even positions in the acquired complex-valued symbols and the spectrum-spread complex-valued symbols are mapped to the time and frequency resources of the first timeslot on the physical uplink control channel; and an orthogonal sequence of the second timeslot is used to perform spectrum spreading on the complex-valued modulation symbols in odd positions in the acquired complex-valued symbols and the spectrum-spread complex-valued symbols are mapped to the time and frequency resources of the second timeslot on the physical uplink control channel. It should be noted that, in the 24 complex-valued modulation symbols acquired in step a, the first complex-valued modulation symbol is a modulation symbol in an even position, the second complex-valued modulation symbol is a modulation symbol in an odd position, and so on.

303: The base station receives a signal transmitted on the physical uplink channel, where the physical uplink channel is used to transmit the uplink control information, where the uplink control information includes the first uplink control information and the second uplink control information.

With respect to this step, the signal that the base station receives from the physical uplink channel includes a signal corresponding to the uplink control information and a signal corresponding to a pilot. The first uplink control information includes periodic channel state information and the second uplink control information includes hybrid automatic repeat acknowledgment information. In the embodiment of the present invention, the signal transmitted on the physical uplink channel may be modulation symbols transmitted on the physical uplink channel, where the modulation symbols include modulation symbols corresponding to the uplink control information and modulation symbols corresponding to a pilot signal, or may be coded bits of the uplink control information transmitted on the physical uplink channel. In the same way, in the following step, a signal corresponding to the first uplink control information may refer to modulation symbols corresponding to the first uplink control information or coded bits corresponding to the first uplink control information, and a signal corresponding to the second uplink control information may refer to modulation symbols corresponding to the second uplink control information or coded bits corresponding to the second uplink control information.

304: The base station detects, according to the received signal that is transmitted on the physical uplink channel, the uplink control information.

That the base station detects the uplink control information specifically includes the following steps:

Step c1: Extract the signal corresponding to the first uplink control information in the signal transmitted on the physical uplink channel and the signal corresponding to the second uplink control information in the information transmitted on the physical uplink channel.

When manner 1 or manner 2 is used to combine the acquired coded bit sequence of the first uplink control information and the acquired coded bit sequence of the second uplink control information to acquire the coded bit sequence of the uplink control information in the foregoing step 33, this step may specifically be implemented by using the following method:

extracting, according to a mechanism for acquiring the coded bit sequence of the uplink control information, the signal corresponding to the first uplink control information in the signal transmitted on the physical uplink channel, and the signal corresponding to the second uplink control information in the signal transmitted on the physical uplink channel. In this case, for the mechanism for acquiring the coded bit sequence of the uplink control information, reference may be made to manner 1 or manner 2 in the foregoing step 33, and details are not described herein again.

For example, the mechanism for acquiring the coded bit sequence of the uplink control information here may be as follows: dividing the coded bit sequence of the first uplink control information into a first part of the coded bit sequence of the first uplink control information and a second part of the coded bit sequence of the first uplink control information, and dividing the coded bit sequence of the second uplink control information into a first part of the coded bit sequence of the second uplink control information and a second part of the coded bit sequence of the second uplink control information; and concatenating the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information. The base station may determine, according to the mechanism for acquiring the coded bit sequence of the uplink control information, positions of the first uplink control information and the second uplink control information on the time and frequency resources, so as to extract the signal corresponding to the first uplink control information in the signal transmitted on the physical uplink channel and the signal corresponding to the second uplink control information in the signal transmitted on the physical uplink channel. In the signal transmitted on the physical uplink channel, the signal corresponding to the first uplink control information may be the modulation symbols corresponding to the first uplink control information or may be the coded bit sequence corresponding to the first uplink control information. In the same way, the signal corresponding to the second uplink control information may be the modulation symbols corresponding to the second uplink control information or may be the coded bit sequence corresponding to the second uplink control information.

When manner 3 is used to combine the acquired coded bit sequence of the first uplink control information and the acquired coded bit sequence of the second uplink control information to acquire the coded bit sequence of the uplink control information in the foregoing step 33, this step may specifically be implemented by using the following method:

extracting, according to a mechanism for acquiring the coded bit sequence of the uplink control information and a mechanism for mapping the coded bit sequence of the uplink control information to the physical uplink control channel, the signal corresponding to the first uplink control information in the signal transmitted on the physical uplink channel and the signal corresponding to the second uplink control information in the signal transmitted on the physical uplink channel. For the specific mechanism for acquiring the coded bit sequence of the uplink control information, reference may be made to manner 3 in step 33, and details are not described herein again.

For example, the mechanism for acquiring the coded bit sequence of the uplink control information here may be as follows: concatenating the coded bit sequence of the second uplink control information and the coded bit sequence of the first uplink control information in sequence. The mechanism for mapping the coded bit sequence of the uplink control information to the physical uplink control channel may be as follows: scrambling the coded bits in the bit sequence of the uplink control information and then modulating the scrambled coded bits to acquire 24 complex-valued modulation symbols; interleaving the acquired 24 complex-valued modulation symbols so that, in the interleaved 24 complex-valued modulation symbols, complex-valued modulation symbols in even positions are arranged in front of complex-valued modulation symbols in odd positions; and mapping the interleaved complex-valued modulation symbols to the physical uplink channel for transmission to the base station. The mechanism for mapping the coded bit sequence of the uplink control information to the physical uplink control channel may also be as follows: scrambling the coded bits in the bit sequence of the uplink control information and then modulating the scrambled coded bits to acquire the 24 complex-valued modulation symbols; using the orthogonal sequence of the first timeslot to perform spectrum spreading on the complex-valued modulation symbols in even positions in the acquired 24 complex-valued symbols and mapping the spectrum-spread complex-valued symbols to the time and frequency resources of the first timeslot on the physical uplink control channel; and using the orthogonal sequence of the second timeslot to perform spectrum spreading on the complex-valued modulation symbols in odd positions in the acquired 24 complex-valued symbols and mapping the spectrum-spread complex-valued symbols to the time and frequency resources of the second timeslot on the physical uplink control channel. The base station may determine, according to the mechanism for acquiring the coded bit sequence of the uplink control information and the mechanism for mapping the coded bit sequence of the uplink control information to the physical uplink control channel, positions of the first uplink control information and the second uplink control information on the time and frequency resources, so as to extract the signal corresponding to the first uplink control information in the signal transmitted on the physical uplink channel and the signal corresponding to the second uplink control information in the signal transmitted on the physical uplink channel.

Step c2: Detect, according to the signal corresponding to the first uplink control information, the first uplink control information and detect, according to the signal corresponding to the second uplink control information, the second uplink control information.

In this step, the base station may use, based on the signal corresponding to the first uplink control information and the signal corresponding to the second uplink control information, a maximum likelihood detection algorithm to detect the first uplink control information and the second uplink control information respectively. Of course, other algorithms may also be used for the detection and a detection process may be implemented according to an existing detection manner. The embodiment poses no specific limitation thereon.

By encoding uplink control information to acquire a coded bit sequence of the uplink control information and transmitting, through a physical uplink channel, the coded bit sequence to a base station, this embodiment supports simultaneous transmission of periodic CSI and an HARQ-ACK. In addition, by distributing both the periodic CSI and the hybrid automatic repeat acknowledgment information HARQ-ACK on time and frequency resources of two timeslots on the physical uplink channel, this embodiment enables both the periodic CSI and the hybrid automatic repeat acknowledgment information HARQ-ACK to acquire better time and frequency diversity gains, thereby better ensuring performance of the periodic CSI and the HARQ-ACK.

Embodiment 3

Figure 5:
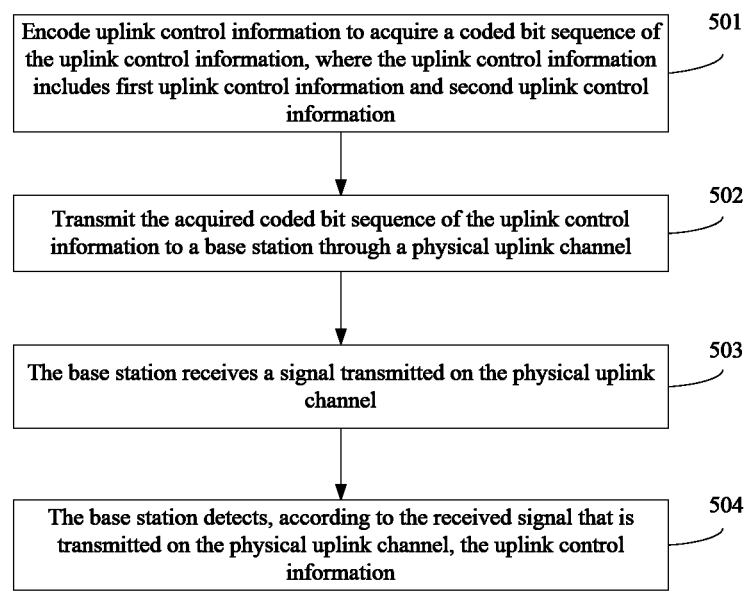
FIG. 5 is a flowchart of a method for transmitting uplink control information according to Embodiment 3 of the present invention.

The embodiment provides a method for transmitting uplink control information. A difference between this method and the foregoing Embodiment 2 lies in a manner for encoding the uplink control information to acquire a coded bit sequence of the uplink control information. As shown in FIG. 5, a process of the method provided by the embodiment is specifically as follows:

501: Encode uplink control information to acquire a coded bit sequence of the uplink control information, where the uplink control information includes first uplink control information and second uplink control information.

Specifically, this step may be implemented through the following several steps:

Step 51: Respectively acquire resources occupied by the first uplink control information and the second uplink control information on a physical uplink channel.

This step is similar to step 31 in the foregoing Embodiment 2. Reference may be made to step 31 in Embodiment 2, and details are not described herein again.

Step 52: Encode the first uplink control information to acquire a coded bit sequence of the first uplink control information and encode the second uplink control information to acquire a coded bit sequence of the second uplink control information.

Specifically, a main difference between this step and step 32 in the foregoing Embodiment 2 is that channel coding methods adopted for the first uplink control information and the second uplink control information are different. The channel coding method in this step may be one of the following two manners:

Manner 1:

Independent channel coding is performed on the first uplink control information and the second uplink control information. Specifically, a (32, O) code is used to encode the first uplink control information to acquire the coded bit sequence of the first uplink control information, where only a single (32, O) code is used to encode the first uplink control information; and a (32, O) code or two (32, O) codes are adopted to encode the second uplink control information to acquire the coded bit sequence of the second uplink control information. When the second uplink control information is encoded, if the number of information bits of the second uplink control information to be transmitted is less than or equal to 11, a (32, O) code is used to encode the second uplink control information; and if the number of information bits of the second uplink control information to be transmitted is greater than 11, two (32, O) codes are used to encode the second uplink control information.

When two (32, O) codes are used to encode the second uplink control information, it may be implemented according to the following steps:

Step a11: Divide an information bit sequence of the second uplink control information into two parts.

Step a12: Use a (32, O) code to encode each part of the information bit sequence of the second uplink control information to acquire a 32-bit coded bit sequence, perform cyclic rate matching on each 32-bit coded bit sequence, and match a rate of a first 32-bit coded bit sequence to $\lceil Q'/2 \rceil \times Q_m$ bits and a rate of a second 32-bit coded bit sequence to $(Q' - \lceil Q'/2 \rceil) \times Q_m$ bits. Here, Q' is the number of modulation symbols corresponding to the second uplink control information, $Q_m$ is a modulation order corresponding to the second uplink control information, and $\lceil \ \rceil$ indicates rounding up, where Q' may also be $Q_{UCI2}/2$ and $Q_{UCI2}$ is the number of coded bits corresponding to the second uplink control information.

Step a13: Combine the two rate-matched coded bit sequences to acquire the coded bit sequence of the second uplink control information.

A combination manner in this step may be as follows: concatenating the two rate-matched coded bit sequences in sequence to acquire the coded bit sequence of the second uplink control information; or alternately selecting, based on a granularity of $Q_m$ coded bits, coded bits from the two rate-matched coded bit sequences to acquire the coded bit sequence of the second uplink control information, where $Q_m$ is the modulation order corresponding to the second uplink control information.

Manner 2:

Independent channel coding is performed on the first uplink control information and the second uplink control information. Specifically, when the number of information bits of the first uplink control information to be transmitted is less than or equal to 11, a (32, O) code is used to encode the first uplink control information, and when the number of information bits of the first uplink control information to be transmitted is greater than 11, two (32, O) codes are used to encode the first uplink control information; when the number of information bits of the second uplink control information to be transmitted is less than or equal to 11, a (32, O) code is used to encode the second uplink control information, and when the number of information bits of the second uplink control information to be transmitted is greater than 11, two (32, O) codes are used to encode the second uplink control information. In this manner, it is possible that three or four (32, O) encoders are used to encode the uplink control information. When two (32, O) codes are used to encode the second uplink control information, the steps are consistent with steps a11 to a13 in manner 1 and are not described herein again. When two (32, O) codes are used to encode the first uplink control information, the steps are similar to steps a11 to a13 in manner 1 and a difference is that Q' is the number of modulation symbols corresponding to the first uplink control information, $Q_m$ is a modulation order corresponding to the first uplink control information, and Q' may also be $Q_{UCI1}/2$, where $Q_{UCI1}$ is the number of coded bits corresponding to the first uplink control information. Other information is not described herein again.

In this encoding manner, the maximum number of information bits that can be transmitted in the uplink control information may also be greater than 11, which is more flexible compared with the channel coding method in Embodiment 2. As a result, this encoding manner is also applicable to a case that the number of information bits of the second uplink control information to be transmitted is greater than 11, which extends application scenarios where simultaneous transmission of the first uplink control information and the second uplink control information are supported.

Combine the acquired coded bit sequence of the first uplink control information and the acquired coded bit sequence of the second uplink control information to acquire a coded bit sequence of the uplink control information.

This step may specifically be implemented by using the method in step 33 in the foregoing Embodiment 2, and details are not described herein again.

It should be note that, when this step is implemented by using manner 1 in step 33 in the foregoing Embodiment 2, the method for combining coded bits in the four parts of coded bit sequences to acquire the coded bit sequence of the uplink control information may also be as follows: combining a first part of the coded bit sequence of the second uplink control information, a first part of the coded bit sequence of the first uplink control information, a second part of the coded bit sequence of the second uplink control information, and a second part of the coded bit sequence of the first uplink control information in sequence to acquire the coded bit sequence of the uplink control information. This combination method enables time and frequency resources occupied by the coded bits of the second uplink control information to be upward extended from the bottom of time and frequency resources of each timeslot and time and frequency resources occupied by the coded bits of the first uplink control information to be downward extended from the top of the time and frequency resources of each timeslot. In this case, when it is assumed that the first uplink control information is periodic CSI and the second uplink control information is hybrid automatic repeat acknowledgment information, in this manner, this step may be implemented by using the following method:

dividing a coded bit sequence $q_0^{CSI}, q_1^{CSI}, q_2^{CSI}, \ldots, q_{Q_{CSI}-1}^{CSI}$ of the periodic CSI into $$q_0^{CSI}, q_1^{CSI}, q_2^{CSI}, \ldots, q_{(12-\lceil (Q_{ACK}/2)/2 \rceil)*2-1}^{CSI} \text{ and}$$

$$q_{(12-\lceil (Q_{ACK}/2)/2 \rceil)*2}^{CSI}, q_{(12-\lceil (Q_{ACK}/2)/2 \rceil)*2+1}^{CSI}, \ldots, q_{Q_{CSI}-1}^{CSI},$$

and dividing a coded bit sequence $q_0^{ACK}, q_1^{ACK}, q_2^{ACK}, \ldots, q_{Q_{ACK}-1}^{ACK}$ of the HARQ-ACK into $$q_0^{ACK}, q_1^{ACK}, q_2^{ACK}, \ldots, q_{\lceil (Q_{ACK}/2)/2 \rceil*2-1}^{ACK} \text{ and}$$

$$q_{\lceil (Q_{ACK}/2)/2 \rceil*2}^{ACK}, q_{\lceil (Q_{ACK}/2)/2 \rceil*2+1}^{ACK}, \ldots, q_{Q_{ACK}-1}^{ACK};$$

and concatenating the first part of the coded bit sequence of the HARQ-ACK, the first part of the coded bit sequence of the CSI, the second part of the coded bit sequence of the HARQ-ACK, and the second part of the coded bit sequence of the CSI in sequence to acquire the coded bit sequence of the uplink control information. Features of various parts of coded bit sequences may also include: The first part of the coded bit sequence of the HARQ-ACK includes $$\left\lceil \frac{(Q_{ACK}/2)}{2} \right\rceil * 2$$

coded bits, the second part of the coded bit sequence of the HARQ-ACK includes $$\left\lfloor \frac{(Q_{ACK}/2)}{2} \right\rfloor * 2 \text{ or } Q_{ACK} - \left\lceil \frac{(Q_{ACK}/2)}{2} \right\rceil * 2$$

coded bits, the first part of the coded bit sequence of the CSI includes $$\left(12 - \left\lceil \frac{(Q_{ACK}/2)}{2} \right\rceil\right) * 2 \text{ or } \left(\left\lceil \frac{(Q_{CSI}/2)}{2} \right\rceil\right) * 2$$

coded bits, and the second part of the coded bit sequence of the CSI includes $$\left(12 - \left\lfloor \frac{(Q_{ACK}/2)}{2} \right\rfloor\right) * 2 \text{ or } Q_{CSI} - \left(\left\lfloor \frac{(Q_{CSI}/2)}{2} \right\rfloor\right) * 2$$

coded bits.

502: Transmit the acquired coded bit sequence of the uplink control information to a base station through a physical uplink channel.

Specifically, this step is similar to step 302 in the foregoing Embodiment 2. Reference may be made to step 302 in the foregoing Embodiment 2, and details are not described herein again.

503: The base station receives a signal transmitted on the physical uplink channel.

With respect to this step, the signal that the base station receives from the physical uplink channel includes a signal corresponding to the uplink control information and a pilot signal.

504: The base station detects, according to the received signal that is transmitted on the physical uplink channel, the uplink control information.

Specifically, this step is similar to step 304 in the foregoing Embodiment 2. A difference is that, in a mechanism for acquiring the coded bit sequence of the uplink control information in this step, the method for encoding the first uplink control information to acquire the coded bit sequence of the first uplink control information and encoding the second uplink control information to acquire the coded bit sequence of the second uplink information is executed according to step 52 in this embodiment, and details are not described herein again.

By encoding uplink control information to acquire a coded bit sequence of the uplink control information and transmitting, through a physical uplink channel, the coded bit sequence to a base station, the embodiment supports simultaneous transmission of periodic CSI and an HARQ-ACK. In addition, by distributing both the periodic CSI and the hybrid automatic repeat acknowledgment information HARQ-ACK on time and frequency resources of two timeslots on the physical uplink channel, the embodiment enables both the periodic CSI and the hybrid automatic repeat acknowledgment information HARQ-ACK to acquire better time and frequency diversity gains, thereby better ensuring performance of the periodic CSI and the HARQ-ACK. In addition, by using two RM codes to perform channel coding on the HARQ-ACK that includes more than 11 bits, the embodiment extends an application scope where simultaneous transmission of the CSI and the HARQ-ACK is supported.

Embodiment 4

Figure 6:
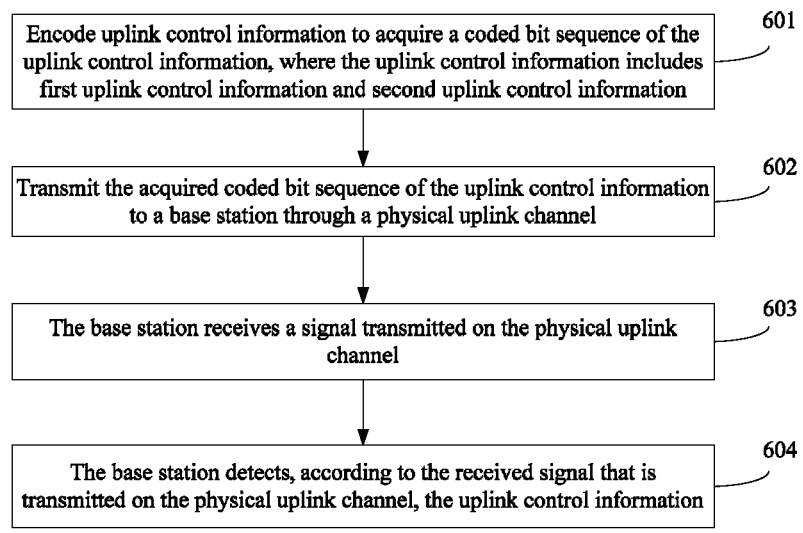
FIG. 6 is a flowchart of a method for transmitting uplink control information according to Embodiment 4 of the present invention.

The embodiment provides a method for transmitting uplink control information. As shown in FIG. 6, a process of the method provided by the embodiment is specifically as follows:

601: Encode uplink control information to acquire a coded bit sequence of the uplink control information, where the uplink control information includes first uplink control information and second uplink control information.

With respect to this step, it is assumed that the first uplink control information includes periodic channel state information and the second uplink control information includes hybrid automatic repeat acknowledgment information in this embodiment.

Specifically, this step may be implemented by using one of the following two manners:

Manner 1:

Step a11: Acquire resources occupied by the first uplink control information and acquire resources occupied by the second uplink control information.

This step is executed to respectively acquire the resources occupied by the first uplink control information and the second uplink control information on a physical uplink channel, where the resources may be the number of modulation symbols or the number of coded bits. That is, this step may be acquiring the number of modulation symbols occupied by the first uplink control information and the number of modulation symbols occupied by the second uplink control information, or may be acquiring the number of coded bits occupied by the first uplink control information and the number of coded bits occupied by the second uplink control information. In addition, in this step, if the resources are the number of modulation symbols, the number of modulation symbols occupied by the first uplink control information and the number of modulation symbols occupied by the second uplink control information both are a multiple of 2; if the resources are the number of coded bits, the number of coded bits occupied by the first uplink control information and the number of coded bits occupied by the second uplink control information is a multiple of $2Q_m$, where $Q_m$ is a modulation order of the uplink control information. For example, when the uplink control information is transmitted on physical uplink control channel format 3, a value of $Q_m$ is 2.

Step a12: Encode the first uplink control information to acquire a coded bit sequence of the first uplink control information and encode the second uplink control information to acquire a coded bit sequence of the second uplink control information.

This step is similar to step 32 in the foregoing Embodiment 2. Reference may be made to step 32 in the foregoing Embodiment 2, and details are not described herein again.

Step a13: Combine the acquired coded bit sequence of the first uplink control information and the acquired coded bit sequence of the second uplink control information to acquire the coded bit sequence of the uplink control information.

For example, it is assumed that the coded bit sequence of the first uplink control information $q_0^{UCI1}, q_1^{UCI1}, q_2^{UCI1}, \ldots, q_{Q_{UCI1}-1}^{UCI1}$, the coded bit sequence of the second uplink control information is $q_0^{UCI2}, q_1^{UCI2}, q_2^{UCI2}, \ldots, q_{Q_{UCI2}-1}^{UCI2}$, and the acquired coded bit sequence of the uplink control information is $b(0), \ldots, b(Q_{UCI1}+Q_{UCI2}-1)$. This step may be implemented by using the following method:

dividing the coded bit sequence of the first uplink control information into a first part of the coded bit sequence of the first uplink control information and a second part of the coded bit sequence of the first uplink control information, and dividing the coded bit sequence of the second uplink control information into a first part of the coded bit sequence of the second uplink control information and a second part of the coded bit sequence of the second uplink control information; concatenating the first part of the coded bit sequence of the second uplink control information, the first part of the coded bit sequence of the first uplink control information, the second part of the coded bit sequence of the second uplink control information, and the second part of the coded bit sequence of the first uplink control information in sequence to acquire the coded bit sequence of the uplink control information; or concatenating the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information. For example, it is assumed that the first uplink control information is periodic CSI and the second uplink control information is the hybrid automatic repeat acknowledgment information. In this manner, this step may be implemented by using the following method:

dividing a coded bit sequence $q_0^{CSI}, q_1^{CSI}, q_2^{CSI}, \ldots, q_{Q_{CSI}-1}^{CSI}$ of the periodic CSI into $$q_0^{CSI}, q_1^{CSI}, q_2^{CSI}, \ldots, q_{\left(12-\lceil\frac{(Q_{ACK}/2)}{4}\rceil*2\right)*Q_m-1}^{CSI} \text{ and}$$

$$q_{\left(12-\lceil\frac{(Q_{ACK}/2)}{4}\rceil*2\right)*Q_m}^{CSI}, q_{\left(12-\lceil\frac{(Q_{ACK}/2)}{4}\rceil*2\right)*Q_m+1}^{CSI}, \ldots, q_{Q_{CSI}-1}^{CSI},$$

and dividing a coded bit sequence $q_0^{ACK}, q_1^{ACK}, q_2^{ACK}, \ldots, q_{Q_{ACK}-1}^{ACK}$ of the HARQ-ACK into $$q_0^{ACK}, q_1^{ACK}, q_2^{ACK}, \ldots, q_{\lceil\frac{(Q_{ACK}/2)}{4}\rceil*2*Q_m-1}^{ACK} \text{ and}$$

$$q_{\lceil\frac{(Q_{ACK}/2)}{4}\rceil*2*Q_m}^{ACK}, q_{\lceil\frac{(Q_{ACK}/2)}{4}\rceil*2*Q_m+1}^{ACK}, \ldots, q_{Q_{ACK}-1}^{ACK};$$

and concatenating the first part of the coded bit sequence of the HARQ-ACK, the first part of the coded bit sequence of the CSI, the second part of the coded bit sequence of the HARQ-ACK, and the second part of the coded bit sequence of the CSI in sequence to acquire the coded bit sequence of the uplink control information.

Where, the first part of the coded bit sequence of the HARQ-ACK includes $$\left\lceil\frac{(Q_{ACK}/2)}{4}\right\rceil*2*Q_m$$

coded bits, the second part of the coded bit sequence of the HARQ-ACK includes $$\left((Q_{ACK}/2)-\left\lceil\frac{(Q_{ACK}/2)}{4}\right\rceil*2\right)*Q_m$$

coded bits, the first part of the coded bit sequence of the CSI includes $$\left(12-\left\lceil\frac{(Q_{ACK}/2)}{4}\right\rceil*2\right)*Q_m \text{ or } \left\lfloor\frac{(Q_{CSI}/2)}{4}\right\rfloor*2*Q_m$$

coded bits, and the second part of the coded bit sequence of the CSI includes $$\left(12-\left((Q_{ACK}/2)-\left\lceil\frac{(Q_{ACK}/2)}{4}\right\rceil*2\right)\right)*Q_m,$$

$$Q_{CSI}-\left(12-\left\lceil\frac{(Q_{ACK}/2)}{4}\right\rceil*2\right)*Q_m, \text{ or } Q_{CSI}-\left\lfloor\frac{(Q_{CSI}/2)}{4}\right\rfloor*2*Q_m$$

coded bits.

Manner 2:

Joint channel coding is performed on the first uplink control information and the second uplink control information to acquire the coded bit sequence of the uplink control information.

Specifically, when the total number of information bits of the first uplink control information and the second uplink control information is less than or equal to 11, a (32, O) code is used to perform joint channel coding on the first uplink control information and the second uplink control information; when the total number of information bits of the first uplink control information and the second uplink control information is greater than 11, two (32, O) codes are used to perform joint channel coding on the first uplink control information and the second uplink control information. When two (32, O) codes are used for channel encoding, this step is divided into the following several steps:

Step a21: Attach an information bit sequence of the second uplink control information to the end of an information bit sequence of the first uplink control information to acquire an information bit sequence of the uplink control information, or attach an information bit sequence of the first uplink control information to the end of an information bit sequence of the second uplink control information to acquire an information bit sequence of the uplink control information.

Step a22: Divide the information bit sequence, which is acquired in step a21, of the uplink control information into two parts.

In this step, the information bit sequence of the uplink control information is divided into two equal parts. If the total number of information bits is an even number, the numbers of information bits of the two parts are equal; if the total number of information bits is an odd number, the number of information bits of one part is one more than the number of information bits of the other part.

Step a23: Use a (32, O) code to encode each part of the information bit sequence of the uplink control information in step a22 to acquire a 32-bit coded bit sequence, perform cyclic rate matching on each 32-bit coded bit sequence, and match a rate of a first 32-bit coded bit sequence to 24 bits and a rate of a second 32-bit coded bit sequence to 24 bits.

Step a24: Combine the two rate-matched coded bit sequences to acquire the coded bit sequence of the uplink control information.

The combination manner in step a24 may be one of the following two manners:

Manner 1:

Each rate-matched coded bit sequence is first divided into two equal parts to acquire four coded bit sequences, where each coded bit sequence includes 12 coded bits, and then the four coded bit sequences are concatenated in sequence.

For example, a first rate-matched coded bit sequence may be divided into coded bit sequence 1 and coded bit sequence 2, and a second rate-matched coded bit sequence is divided into coded bit sequence 3 and coded bit sequence 4. Then coded bit sequence 1, coded bit sequence 2, coded bit sequence 3, and coded bit sequence 4 are concatenated in sequence to acquire the coded bit sequence of the uplink control information.

Manner 2:

Based on a granularity of $Q_m$ coded bits, coded bits are alternately selected from the two rate-matched coded bit sequences to acquire a 48-bit coded bit sequence. Then the 48-bit coded bit sequence is divided into four parts and the four parts are concatenated in sequence to acquire the coded bit sequence of the uplink control information.

The method for dividing the 48-bit coded bit sequence into four parts may be as follows: selecting, based on a granularity of $Q_m$ coded bits, coded bits from the first 24 coded bits in the 48-bit coded bit sequence to acquire a first part and a second part, where coded bits selected at even selections constitute the first part and coded bits selected at odd selections constitute the second part; and selecting, based on a granularity of $Q_m$ coded bits, coded bits from the last 24 coded bits in the 48-bit coded bit sequence to acquire a third part and a fourth part, where coded bits selected at even selects constitute the second part and coded bits selected at odd selections constitute the fourth part.

602: Transmit the acquired coded bit sequence of the uplink control information to a base station through the physical uplink channel.

The physical uplink channel in this step may be physical uplink control channel format 3 (PUCCH format 3).

Coded bits in the coded bit sequence of the uplink control information are scrambled and modulated to acquire a group of complex-valued modulation symbols; an orthogonal sequence is used to perform spectrum spreading on the acquired complex-valued modulation symbols to acquire spectrum-spread complex-valued modulation symbols; and the spectrum-spread complex-valued modulation symbols are mapped to a physical uplink control channel for transmission to the base station.

Figure 7:
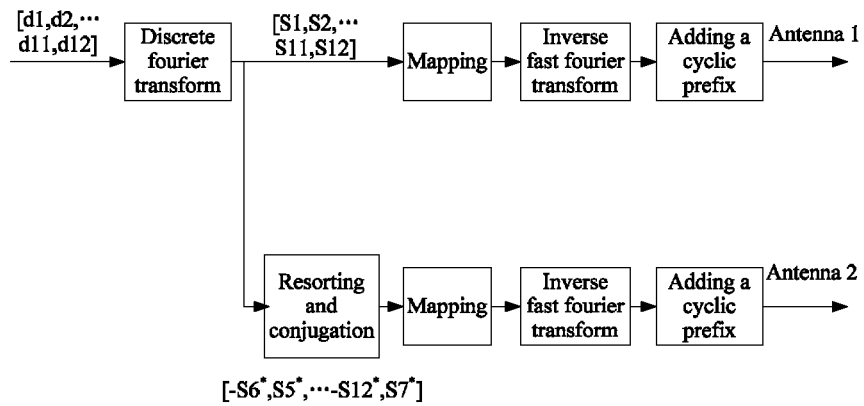
FIG. 7 is a schematic diagram illustrating a transmit diversity mode according to Embodiment 4 of the present invention.

In this step, when a user equipment adopts a transmit diversity mode to send physical uplink control channel format 3, a transmit diversity solution shown in FIG. 7 may be used. In FIG. 7, [d1, d2, . . . d11, d12] is modulation symbols before discrete fourier transform, [S1, S2, . . . S11, S12] is modulation symbols after discrete fourier transform, and [−S6*, S5*, . . . −S12*, S7*] is modulation symbols acquired after discrete fourier transform, resorting, and conjugation. When this solution is adopted for sending, by using the method for acquiring a coded bit sequence of uplink control information in step 601, the embodiment can ensure that the periodic CSI and the hybrid automatic repeat acknowledgment information HARQ-ACK both are distributed on time and frequency resources of two timeslots on the physical uplink control channel, so as to enable both the periodic CSI and the hybrid automatic repeat acknowledgment information HARQ-ACK to acquire better time and frequency diversity gains, thereby better ensuring performance of the periodic CSI and the HARQ-ACK. This embodiment also enables the base station to use a maximum likelihood detection algorithm combining data and a pilot to independently decode the periodic CSI and the hybrid automatic repeat acknowledgment information. On one hand, transmission performance of the uplink control information can be improved through the algorithm; and on the other hand, independent decoding can reduce decoding complexity.

603: The base station receives a signal transmitted on the physical uplink channel.

With respect to this step, the signal that the base station receives from the physical uplink channel includes a signal corresponding to the uplink control information and a pilot signal.

604: The base station detects, according to the received signal that is transmitted on the physical uplink channel, the uplink control information.

Specifically, when the encoding mode in manner 1 is used to acquire the coded bit sequence of the uplink control information in the foregoing step 601, this step is similar to step 304 in Embodiment 2. A difference is that a mechanism for acquiring the coded bit sequence of the uplink control information in this step adopts manner 1 in step 601 in this embodiment and other information is similar. Reference may be made to relevant descriptions in step 304 in the foregoing Embodiment 2, and details are not described herein again.

By encoding uplink control information to acquire a coded bit sequence of the uplink control information and transmitting, through a physical uplink channel, the coded bit sequence to a base station, the method provided by the embodiment supports simultaneous transmission of periodic CSI and an HARQ-ACK. In addition, by distributing the periodic CSI and the hybrid automatic repeat acknowledgment information HARQ-ACK on time and frequency resources of two timeslots on the physical uplink channel, the method enables both the periodic CSI and the hybrid automatic repeat acknowledgment information HARQ-ACK to acquire better time and frequency diversity gains, thereby better ensuring performance of the periodic CSI and the HARQ-ACK. In addition, the present invention enables the base station to perform maximum likelihood detection based on data and a pilot to independently decode the periodic CSI and the hybrid automatic repeat acknowledgment information. On one hand, transmission performance of the uplink control information can be improved through the algorithm; and on the other hand, independent decoding can reduce decoding complexity.

Embodiment 5

Figure 8:
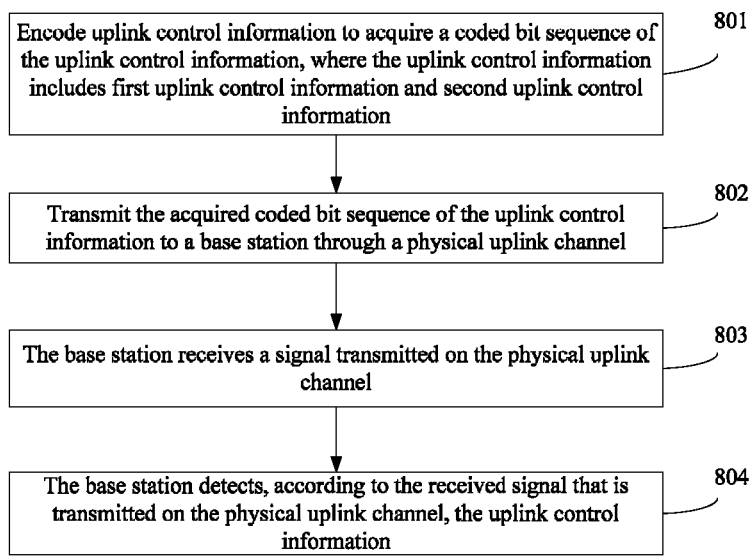
FIG. 8 is a flowchart of a method for transmitting uplink control information according to Embodiment 5 of the present invention.

The embodiment provides a method for transmitting uplink control information. The method can support simultaneous transmission of periodic CSI and hybrid automatic repeat acknowledgment information and can avoid a fuzziness problem caused by PDCCH loss, thereby improving transmission performance of the hybrid automatic repeat acknowledgment information. It should be noted that the embodiment poses no limitation on application scenarios of the method but the embodiment preferably applies to a scenario that a subframe is required to transmit the periodic CSI and the hybrid automatic repeat acknowledgment information at the same time and a user equipment is configured with physical uplink control channel format 3 for feeding back the hybrid automatic repeat acknowledgment information in a TDD (time division duplex) system. As shown in FIG. 8, a process of the method provided by the embodiment specifically includes the following several steps:

801: Encode uplink control information to acquire a coded bit sequence of the uplink control information, where the uplink control information includes first uplink control information and second uplink control information.

The first uplink control information includes periodic channel state information and the second uplink control information includes hybrid automatic repeat acknowledgment information.

For a normal cyclic prefix (Normal CP), in this step, the uplink control information may be encoded according to the following manners:

Scenario 1: When a user equipment receives only one PDSCH transmission transmitted on a primary carrier and detects neither a PDCCH corresponding to the PDSCH transmission nor a PDCCH that is used to indicate release of downlink SPS (semi-persistent scheduling), this step is implemented according to the following two steps:

Step a11: Use a (32, O) code to encode the first uplink control information to acquire a coded bit sequence of the first uplink control information.

In this step, the coded bit sequence of the first uplink control information may include 20 coded bits. For example, the coded bit sequence of the first uplink control information may be represented by $b_i=b'_i$, i=0, . . . , 19.

Step a12: Attach a bit $a''_0$ and a bit $a'_1$ to the end of the coded bit sequence, which is acquired in step 1a, of the first uplink control information to acquire the coded bit sequence of the uplink control information, where $a''_0$ is a 1-bit hybrid automatic repeat acknowledgment information bit corresponding to the received PDSCH and $a''_1$ is a NACK.

The user equipment receives only one PDSCH transmission transmitted on the primary carrier within a downlink subframe set corresponding to an uplink subframe n and detects neither the PDCCH corresponding to the PDSCH transmission nor the PDCCH that is used to indicate release of downlink SPS within the downlink subframe set, that is, the user equipment receives only a semi-persistent scheduling SPS PDSCH transmission transmitted on the primary carrier within the downlink subframe set corresponding to the uplink subframe n. In this step, $a''_0$ is the hybrid automatic repeat acknowledgment information bit corresponding to the PDSCH received by the user equipment. For example, if the PDSCH data is correct, $a''_0$ is an ACK; if the PDSCH data is incorrect, $a''_0$ is an NACK. It should be noted that the ACK is encoded into 1 and the NACK is encoded into 0 in this step and therefore $a''_1$ is 0.

The coded bit sequence, which is acquired in this step, of the uplink control information may be represented by $b_i=b'_i$, i=0, . . . , 21, where $b_i=b'_i$, i=0, . . . , 19 is the coded bit sequence of the first uplink control information (that is, the periodic CSI), which is acquired in step a11, that is, $b_{20}=a''_0$, $b_{21}=a''_1$.

Scenario 2: When a user equipment receives only one PDSCH transmission transmitted on a primary carrier and detects that a value of a DAI (downlink assignment index) in a PDCCH corresponding to the PDSCH transmission is 1 or when the user equipment receives only a PDCCH that is used to indicate release of downlink SPS and a value of a DAI in the PDCCH is 1, this step is implemented according to the following two steps:

Step a21: Use a (32, O) code to encode the first uplink control information to acquire a coded bit sequence of the first uplink control information.

In this step, the coded bit sequence of the first uplink control information may include 20 coded bits. For example, the coded bit sequence of the first uplink control information may be represented by $b_i=b'_i$, i=0, . . . , 19.

Step a22: If the PDSCH received by the user equipment corresponds to two transport blocks, attach a bit $a''_0$ and a bit $a''_1$ to the end of the coded bit sequence, which is acquired in step a21, of the first uplink control information to acquire the coded bit sequence of the uplink control information, where the bit $a''_0$ and the bit $a''_1$ respectively correspond to hybrid automatic repeat acknowledgment information bits corresponding to code word 0 and code word 1; if the PDSCH received by the user equipment corresponds to one transport block, attach the bit $a''_0$ to the end of the coded bit sequence, which is acquired in step a21, of the first uplink control information to acquire the coded bit sequence of the uplink control information, where the bit $a''_0$ corresponds to a hybrid automatic repeat acknowledgment information bit corresponding to the received PDSCH; if the user equipment receives only the PDCCH that is used to indicate release of downlink SPS, attach the bit $a''_0$ to the end of the coded bit sequence, which is acquired in step a21, of the first uplink control information to acquire the coded bit sequence of the uplink control information, where the bit $a''_0$ is a 1-bit hybrid automatic repeat acknowledgment information bit corresponding to the detected PDCCH that is used to indicate release of downlink SPS.

Scenario 3: When a user equipment receives only one PDSCH transmission transmitted on a primary carrier but detects no PDCCH corresponding to the PDSCH transmission, and detects a PDCCH that is used to indicate release of downlink SPS and a value of a DAI in the PDCCH is 1, this step is implemented according to the following two steps:

Step a31: Use a (32, O) code to encode the first uplink control information to acquire a coded bit sequence of the first uplink control information.

In this step, the coded bit sequence of the first uplink control information may include 20 coded bits. For example, the coded bit sequence of the first uplink control information may be represented by $b_i=b'_i$, i=0, . . . , 19.

Step a32: Attach a bit $a''_0$ and a bit $a''_1$ to the end of the coded bit sequence, which is acquired in step a31, of the first uplink control information to acquire the coded bit sequence of the uplink control information, where $a''_0$ is a 1-bit hybrid automatic repeat acknowledgment information bit corresponding to the received PDSCH and $a''_1$ is a 1-bit hybrid automatic repeat acknowledgment information bit corresponding to the detected PDCCH that is used to indicate release of downlink SPS.

Scenario 4: When a user equipment receives only one PDSCH transmission transmitted on a primary carrier without detecting a PDCCH corresponding to the PDSCH transmission, and also receives another PDSCH transmission transmitted on the primary carrier with a value of a DAI in a PDCCH corresponding to the PDSCH being 1, this step is implemented according to the following two steps:

Step a41: Use a (32, O) code to encode the first uplink control information to acquire a coded bit sequence of the first uplink control information.

In this step, the coded bit sequence of the first uplink control information may include 20 coded bits. For example, the coded bit sequence of the first uplink control information may be represented by b=0, . . . , 19.

Step a42: Attach a bit $a''_0$ and a bit $a''_1$ to the end of the coded bit sequence, which is acquired in step a41, of the first uplink control information to acquire the coded bit sequence of the uplink control information, where $a''_0$ is a 1-bit hybrid automatic repeat acknowledgment information bit corresponding to the received PDSCH that has no corresponding PDCCH and $a''_1$ is a 1-bit hybrid automatic repeat acknowledgment information bit corresponding to the PDSCH with the corresponding PDCCH detected.

In this step, when the PDSCH that is received on the primary carrier and has the corresponding PDCCH corresponds to two data transport blocks, hybrid automatic repeat acknowledgment information of these two transport blocks are bundled to acquire the 1-bit hybrid automatic repeat acknowledgment information bit corresponding to the PDSCH, that is, $a''_1$ is an automatic repeat acknowledgment information bit acquired by bundling the hybrid automatic repeat acknowledgment information of the two data transport blocks of the PDSCH that has the corresponding PDCCH.

Scenario 5: In addition to the foregoing four cases, a user equipment may adopt the method for acquiring a coded bit sequence of uplink control information according to Embodiment 2 or Embodiment 3 to implement this step.

In an actual scenario, a user equipment automatically determines, according to detected PDSCH and PDCCH, whether to adopt steps a11 and step a12, steps a21 and a22, steps a31 and a32, or steps a41 and a42 to encode the uplink control information. However, in the actual scenario, physical downlink control channel PDCCH loss may occur (that is, a base station sends a PDCCH to the user equipment but the user equipment does not detect the PDCCH). For example, the base station originally performs scheduling according to scenario 3 or 4. Due to PDCCH loss, however, a user equipment sends the uplink control information according to scenario 1 but the base station detects the uplink control information according to the encoding and transmission methods corresponding to scenario 3 or 4, which causes the hybrid automatic repeat acknowledgment information to be incorrectly decoded. To avoid the problem that the hybrid automatic repeat acknowledgment information cannot be correctly decoded due to PDCCH loss, even when the user equipment receives only SPS PDSCH data, which generally requires attaching only a bit $a''_0$ to the end of the coded bit sequence of the first uplink control information to acquire the coded bit sequence of the uplink control information, the embodiment still attaches the bit $a''_0$ and a bit $a''_1$ to the end of the coded bit sequence of the first uplink control information, where $a''_1$ is replaced by a NACK, to enable the base station to perform decoding according to the manner in which the two bits are attached, thereby ensuring that the hybrid automatic repeat acknowledgment information can be correctly decoded.

For an extended cyclic prefix (extended CP), in this step, the uplink control information may be encoded according to the following manners:

Scenario 1: When a user equipment receives only one PDSCH transmission transmitted on a primary carrier and detects neither a PDCCH corresponding to the PDSCH transmission nor a PDCCH that is used to indicate release of downlink SPS, this step is implemented according to the following two steps:

Step b11: Attach a bit $a''_0$ to the end of an information bit sequence $a'_0, a'_1, a'_2, a'_3, \ldots, a'_{A'-1}$ of the first uplink control information to acquire an information bit sequence $a_0, a_1, a_2, a_3, \ldots, a_{A-1}$ of the uplink control information, where $a_{A'}=a''_0$, A' is the number of information bits of the first uplink control information, and A=A'+1.

Step b12: Use a (32, O) code to encode the information bit sequence, which is acquired in step b11, of the uplink control information to acquire the coded bit sequence of the uplink control information.

Scenario 2: When a user equipment receives only one PDSCH transmission transmitted on a primary carrier and detects that a value of a DAI in a PDCCH corresponding to the PDSCH transmission is 1 or when the user equipment receives only a PDCCH that is used to indicate release of downlink SPS and a value of a DAI in the PDCCH is 1, this step is implemented according to the following two steps:

Step b21: If the PDSCH received by the user equipment corresponds to two transport blocks, attach bits $a''_0$ and $a''_1$ to the end of an information bit sequence $a'_0, a'_1, a'_2, a'_3, \ldots, a'_{A'-1}$ of the first uplink control information to acquire an information bit sequence $a_0, a_1, a_2, a_3, \ldots, a_{A-1}$ of the uplink control information, where $a_{A'}=a''_0$, $a_{(A'+1)}=a''_1$, A' is the number of information bits of the first uplink control information, and A=A'+2; if the PDSCH received by the user equipment corresponds to one transport block or the user equipment receives only the PDCCH that is used to indicate release of downlink SPS, attach the bit $a''_0$ to the end of the information bit sequence $a'_0, a'_1, a'_2, a'_3, \ldots, a'_{A'-1}$ of the first uplink control information to acquire the information bit sequence $a_0, a_1, a_2, a_3, \ldots, a_{A-1}$ of the uplink control information, where $a_{A'}=a''_0$, A' is the number of information bits of the first uplink control information, and A=A'+1.

Step b22: Use a (32, O) code to encode the information bit sequence, which is acquired in step b21, of the uplink control information to acquire the coded bit sequence of the uplink control information.

Scenario 3: When a user equipment receives only one PDSCH transmission transmitted on a primary carrier but detects no PDCCH corresponding to the PDSCH transmission, and detects a PDCCH that is used to indicate release of downlink SPS and a value of a DAI in the PDCCH is 1, this step is implemented according to the following two steps:

Step b31: Attach bits $a''_0$ and $a''_1$ to the end of an information bit sequence $a'_0, a'_1, a'_2, a'_3, \ldots, a'_{A'-1}$ of the first uplink control information to acquire an information bit sequence $a_0, a_1, a_2, a_3, \ldots, a_{A-1}$ of the uplink control information, where $a_{A'}=a''_0$, $a_{(A'+1)}=a''_1$, A' is the number of information bits of the first uplink control information, and A=A'+2.

In this step, $a''_0$ is a 1-bit hybrid automatic repeat acknowledgment information bit corresponding to the received PDSCH (that is, a hybrid automatic repeat acknowledgment information bit corresponding to an SPS PDSCH), and $a''_1$ is a 1-bit hybrid automatic repeat acknowledgment information bit corresponding to the detected PDCCH that is used to indicate release of downlink SPS.

Step b32: Use a (32, O) code to encode the information bit sequence, which is acquired in step a31, of the uplink control information to acquire the coded bit sequence of the uplink control information.

Scenario 4: When a user equipment receives only one PDSCH transmission transmitted on a primary carrier but detects no PDCCH corresponding to the PDSCH transmission, and also receives another PDSCH transmission transmitted on the primary carrier and a value of a DAI in a PDCCH corresponding to the PDSCH is 1, this step is implemented according to the following two steps:

Step b41: Attach bits $a''_0$ and $a''_1$ to the end of an information bit sequence $a'_0, a'_1, a'_2, a'_3, \ldots, a'_{A'-1}$ of the first uplink control information to acquire an information bit sequence $a_0, a_1, a_2, a_3, \ldots, a_{A-1}$ of the uplink control information, where $a_{A'}=a''_0$, $a_{(A'+1)}=a''_1$, A' is the number of information bits of the first uplink control information, and $A=A'+2$.

In this step, $a''_0$ is a 1-bit hybrid automatic repeat acknowledgment information bit corresponding to the received PDSCH that has no corresponding PDCCH (that is, a hybrid automatic repeat acknowledgment information bit corresponding to an SPS PDSCH), and $a''_1$ is a 1-bit hybrid automatic repeat acknowledgment information bit corresponding to the PDSCH that has the corresponding PDCCH.

Step b42: Use a (32, O) code to encode the information bit sequence, which is acquired in step b41, of the uplink control information to acquire the coded bit sequence of the uplink control information.

Scenario 5: In addition to the foregoing four cases, a user equipment may adopt the method for acquiring a coded bit sequence of uplink control information according to Embodiment 2 or Embodiment 3 to implement this step.

For the Extended CP, in scenarios 3 and 4, corresponding $a''_0$ to the hybrid automatic repeat acknowledgment information bit corresponding to the SPS PDSCH can ensure that the hybrid automatic repeat acknowledgment information is correctly decoded even if PDCCH loss occurs. If PDCCH loss occurs, the user equipment performs encoding according to the encoding method in scenario 1. In this case, positions of information bits of the hybrid automatic repeat acknowledgment information corresponding to the SPS PDSCH keep unchanged in the information bit sequence of the uplink control information no matter whether the user equipment performs encoding according to the encoding method corresponding to scenario 1, 3, or 4, so that a base station can correctly decode the hybrid automatic repeat acknowledgment information corresponding to the SPS PDSCH.

It should be noted that the encoding method in scenario 1 may also be replaced with the encoding method in scenario 3 or 4 to avoid the fuzziness problem caused by PDCCH loss. In this case, $a''_0$ is the 1-bit hybrid automatic repeat acknowledgment information bit corresponding to the received SPS PDSCH and $a''_1$ is the NACK.

802: Transmit the acquired coded bit sequence of the uplink control information to the base station through a physical uplink channel.

In this step, in a normal cyclic prefix scenario, different physical uplink channel formats are adopted for different scenarios corresponding to step 801 to transmit the acquired coded bit sequence of the uplink control information. Specifically, in scenarios 1, 3, and 4, the user equipment adopts physical uplink control channel format 2b (PUCCH format 2b) to transmit the acquired coded bit sequence of the uplink control information, that is, the physical uplink channel in this step is physical uplink control channel format 2b, or it can be said that the acquired coded bit sequence of the uplink control information is transmitted, based on physical uplink control channel format 2b, to the base station through a physical uplink control channel. In scenario 2, if the PDSCH received by the user equipment corresponds to two transport blocks, the user equipment adopts physical uplink control channel format 2b (PUCCH format 2b) for transmission; if the PDSCH received by the user equipment corresponds to one transport block or the user equipment receives only the PDCCH that is used to indicate release of downlink SPS, the user equipment adopts physical uplink control channel format 2a (PUCCH format 2a) for transmission.

In an extended cyclic prefix scenario, physical uplink channel format 2 is adopted for transmission.

803: The base station receives a signal transmitted on the physical uplink channel.

In this step, the signal that the base station receives from the physical uplink channel includes a signal corresponding to the uplink control information and a pilot signal.

804: The base station detects, according to the received signal that is transmitted on the physical uplink channel, the uplink control information.

In this step, the base station first determines, according to the uplink control information to be detected, a physical uplink control channel format that the user equipment uses to transmit the uplink control information. For example, in a normal cyclic prefix scenario, when the base station only transmits one PDSCH transmission on the primary carrier to the user equipment and sends neither the PDCCH corresponding to the PDSCH nor the PDCCH that is used to indicate release of downlink SPS to the user equipment on a current subframe, the base station determines a physical uplink control channel format that the user equipment uses to transmit the uplink control information as physical uplink control channel format 2b (PUCCH format 2b). The base station detects, based on a transmission format of PUCCH format 2b, the uplink control information sent by the user equipment, or, in other words, the base station detects, based on physical uplink control channel format 2b, the uplink control information according to information transmitted on the physical uplink channel.

This step may further include: decoding, by the base station according to a mechanism for acquiring the coded bit sequence of the uplink control information, the uplink control information transmitted by the user equipment. For the mechanism for acquiring the coded bit sequence of the uplink control information in this step, reference may be made to step 1, and details are not described herein again. For example, in a normal cyclic prefix scenario, when the base station only transmits one PDSCH transmission on the primary carrier to the user equipment and sends neither the PDCCH corresponding to the PDSCH nor the PDCCH that is used to indicate release of downlink SPS to the user equipment on a current subframe, according to the mechanism for acquiring the coded bit sequence of the uplink control information in step 1, the last two bits in the coded bit sequence of the uplink control information correspond to information bits of the second uplink control information (that is, the hybrid automatic repeat acknowledgment information) and the last but one bit is hybrid automatic repeat acknowledgment information of the SPS PDSCH data that the base station transmits to the user equipment.

By transmitting uplink control information according to PUCCH format 2b when a user equipment receives only SPS PDSCH data, the method provided by the embodiment avoids fuzziness caused by PDCCH loss and thereby ensures that hybrid automatic repeat acknowledgment information is correctly decoded.

Embodiment 6

Figure 9:
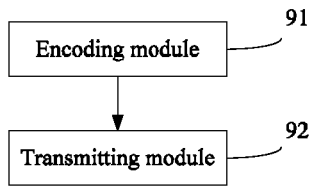
FIG. 9 is a schematic structural diagram of a user equipment according to Embodiment 6 of the present invention.

The embodiment provides a user equipment. The user equipment is configured to execute the methods for transmitting uplink control information in embodiments 1 to 5. As shown in FIG. 9, the equipment includes:

an encoding module 91, configured to encode uplink control information to acquire a coded bit sequence of the uplink control information, where the uplink control information includes first uplink control information and second uplink control information; and a transmitting module 92, configured to transmit the coded bit sequence, which is acquired by the encoding module 91, of the uplink control information to a base station through a physical uplink channel.

Figure 10:
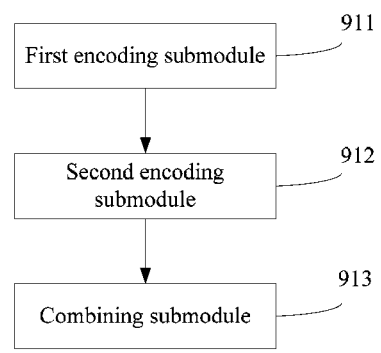
FIG. 10 is a schematic structural diagram of an encoding module according to Embodiment 6 of the present invention.

Furthermore, as shown in FIG. 10, the encoding module 91 specifically includes:

a first encoding submodule 911, configured to encode the first uplink control information to acquire a coded bit sequence of the first uplink control information;

a second encoding submodule 912, configured to encode the second control information to acquire a coded bit sequence of the second uplink control information; and a combining submodule 913, configured to combine the coded bit sequence, which is acquired by the first encoding submodule 911, of the first uplink control information and the coded bit sequence, which is acquired by the second encoding submodule 912, of the second uplink control information to acquire the coded bit sequence of the uplink control information.

Figure 11:
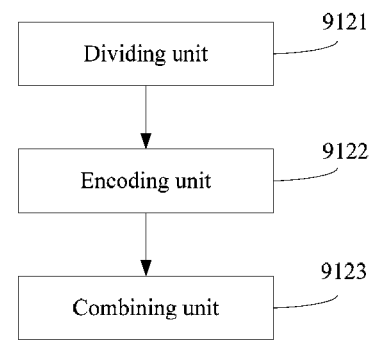
FIG. 11 is a schematic structural diagram of a second encoding submodule according to Embodiment 6 of the present invention.

As shown in FIG. 11, the second encoding submodule 912 specifically includes:

a dividing unit 9121, configured to divide an information bit sequence of the second uplink control information into two parts;

an encoding unit 9122, configured to use a (32, O) code to encode each part of the information bit sequence of the second uplink control information to acquire a 32-bit coded bit sequence, perform cyclic rate matching on each 32-bit coded bit sequence, and match a rate of a first 32-bit coded bit sequence to $\lceil Q'/2 \rceil \times Q_m$ bits and a rate of a second 32-bit coded bit sequence to $(Q-\lceil Q'/2 \rceil) \times Q_m$ bits, where Q' is the number of modulation symbols corresponding to the second uplink control information, $Q_m$ is a modulation order corresponding to the second uplink control information, and $\lceil \ \rceil$ indicates rounding up, where Q' may also be $Q_{UCI2}/2$ and $Q_{UCI2}$ is the number of coded bits corresponding to the second uplink control information; and a combining unit 9123, configured to combine the two rate-matched coded bit sequences acquired by the encoding unit 9122 to acquire the coded bit sequence of the second uplink control information.

The combining unit 9123 is specifically configured to concatenate the two rate-matched coded bit sequences in sequence to acquire the coded bit sequence of the second uplink control information or alternately select, based on a granularity of coded bits whose quantity is equal to the modulation order of the uplink control information, coded bits from the two rate-matched coded bit sequences of the second uplink control information to acquire the coded bit sequence of the second uplink control information.

It should be noted that, in the embodiment of the present invention, for the dividing, by the dividing unit 9121 of the second encoding submodule 912, the information bit sequence of the second uplink control information into two parts, an encoding process of the encoding unit 9122, and a manner that the combining unit 9123 uses to combine the coded bit sequences acquired by the encoding unit 9122, reference may be made to relevant descriptions of step 52 in the foregoing Embodiment 3, and details are not described herein again.

Figure 12:
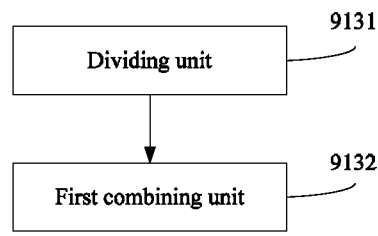
FIG. 12 is a schematic structural diagram of a combining submodule according to Embodiment 6 of the present invention.

As shown in FIG. 12, the combining submodule 913 specifically includes:

a dividing unit 9131, configured to divide the coded bit sequence of the first uplink control information into a first part of the coded bit sequence of the first uplink control information and a second part of the coded bit sequence of the first uplink control information, and divide the coded bit sequence of the second uplink control information into a first part of the coded bit sequence of the second uplink control information and a second part of the coded bit sequence of the second uplink control information; and a first combining unit 9132, configured to concatenate the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information.

For example, it is assumed that the first uplink control information is periodic CSI, the second uplink control information is hybrid automatic repeat acknowledgment information HARQ-ACK, a coded bit sequence of the periodic CSI is $q_0^{CSI}, q_1^{CSI}, q_2^{CSI}, \ldots, q_{Q_{CDI}-1}^{CSI}$ and a coded bit sequence of the HARQ-ACK is $q_0^{ACK}, q_1^{ACK}, q_2^{ACK}, \ldots, q_{Q_{CDI}-1}^{ACK}$. The dividing unit 9131 of the combining submodule 913 is specifically configured to:

divide the coded bit sequence of the periodic CSI into a first part of the coded bit sequence $$q_0^{CSI}, q_1^{CSI}, q_2^{CSI}, \ldots, q_{\lceil \frac{(Q_{CSI}/2)}{2} \rceil * 2 - 1}^{CSI}$$

of the CSI and a second part of the coded bit sequence $$q_{\lceil \frac{(Q_{CSI}/2)}{2} \rceil * 2}^{CSI}, q_{\lceil \frac{(Q_{CSI}/2)}{2} \rceil * 2 + 1}^{CSI}, \ldots, q_{Q_{CSI}-1}^{CSI}$$

of the CSI; divide the coded bit sequence of the HARQ-ACK into a first part of the coded bit sequence $$q_0^{ACK}, q_1^{ACK}, q_2^{ACK}, \ldots, q_{(12-\lceil \frac{(Q_{CSI}/2)}{2} \rceil) * 2 - 1}^{ACK}$$

of the HARQ-ACK and a second part of the coded bit sequence $$q_{(12-\lceil \frac{(Q_{CSI}/2)}{2} \rceil) * 2}^{ACK}, q_{(12-\lceil \frac{(Q_{CSI}/2)}{2} \rceil) * 2 + 1}^{ACK}, \ldots, q_{Q_{ACK}-1}^{ACK}$$

of the HARQ-ACK; or divide the coded bit sequence of the HARQ-ACK into a first part of the coded bit sequence $$q_0^{ACK}, q_1^{ACK}, q_2^{ACK}, \ldots, q_{(\lceil \frac{(Q_{ACK}/2)}{2} \rceil) * 2 - 1}^{ACK}$$

of the HARQ-ACK and a second part of the coded bit sequence $$q_{(\lceil \frac{(Q_{ACK}/2)}{2} \rceil) * 2}^{ACK}, q_{(\lceil \frac{(Q_{ACK}/2)}{2} \rceil) * 2 + 1}^{ACK}, \ldots, q_{Q_{ACK}-1}^{ACK}$$

of the HARQ-ACK.

Furthermore, the first part of the coded bit sequence of the CSI, which is divided by the dividing unit 9131, includes $$\left\lceil \frac{(Q_{CSI}/2)}{2} \right\rceil * 2$$

coded bits and the second part of the coded bit sequence of the CSI includes $$\left\lfloor \frac{(Q_{CSI}/2)}{2} \right\rfloor * 2 \text{ or } Q_{CSI} - \left\lceil \frac{(Q_{CSI}/2)}{2} \right\rceil * 2$$

coded bits; the first part of the coded bit sequence of the HARQ-ACK, which is divided by the dividing unit 9131, includes $$\left(12 - \left\lceil \frac{(Q_{CSI}/2)}{2} \right\rceil\right) * 2 \text{ or } \left(\left\lceil \frac{(Q_{ACK}/2)}{2} \right\rceil\right) * 2$$

coded bits and the second part of the coded bit sequence of the HARQ-ACK includes $$\left(12 - \left\lfloor \frac{(Q_{CSI}/2)}{2} \right\rfloor\right) * 2 \text{ or } Q_{ACK} - \left(\left\lceil \frac{(Q_{ACK}/2)}{2} \right\rceil\right) * 2$$

coded bits.

It should be noted that, in the embodiment of the present invention, for a manner that the dividing unit 9131 of the combining submodule 913 uses to divide information bit sequences of the first uplink control information and the second uplink control information and a manner that the first combining unit 9132 uses to combine the coded bit sequences divided by the dividing unit 9131, reference may be made to relevant descriptions of combination manner 1 in step 32 in the foregoing Embodiment 2, and details are not described herein again.

Optionally, with reference to relevant descriptions of combination manner 2 of step 32 in the foregoing Embodiment 2, the combining submodule 913 is specifically configured to concatenate the coded bit sequence of the first uplink control information and the coded bit sequence of the second uplink control information in sequence to acquire a concatenated coded bit sequence; and select, based on a granularity of coded bits whose quantity is equal to the modulation order of the uplink control information, coded bits from the concatenated coded bit sequence to acquire the coded bit sequence of the uplink control information.

Optionally, with reference to relevant descriptions of combination manner 3 of step 32 in the foregoing Embodiment 2, the combining submodule 913 is specifically configured to concatenate the coded bit sequence of the first uplink control information and the coded bit sequence of the second uplink control information in sequence or concatenate the coded bit sequence of the second uplink control information and the coded bit sequence of the first uplink control information in sequence, and use a concatenated coded bit sequence as the coded bit sequence of the uplink control information.

Figure 13:
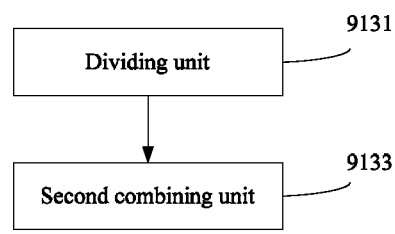
FIG. 13 is a schematic structural diagram of another combining submodule according to Embodiment 6 of the present invention.

Optionally, with reference to relevant descriptions of step 502 in the foregoing Embodiment 3, as shown in FIG. 13, the combining submodule 913 specifically includes:

a dividing unit 9131, configured to divide the coded bit sequence of the first uplink control information into a first part of the coded bit sequence of the first uplink control information and a second part of the coded bit sequence of the first uplink control information, and divide the coded bit sequence of the second uplink control information into a first part of the coded bit sequence of the second uplink control information and the second part of the coded bit sequence of the second uplink control information; and a second combining unit 9133, configured to concatenate the first part of the coded bit sequence of the second uplink control information, the first part of the coded bit sequence of the first uplink control information, the second part of the coded bit sequence of the second uplink control information, and the second part of the coded bit sequence of the first uplink control information in sequence to acquire the coded bit sequence of the uplink control information.

For example, it is assumed that the first uplink control information is periodic CSI, the second uplink control information is hybrid automatic repeat acknowledgment information HARQ-ACK, a coded bit sequence of the periodic CSI is $q_0^{CSI}, q_1^{CSI}, q_2^{CSI}, \ldots, q_{Q_{CSI}-1}^{CSI}$, and a coded bit sequence of the HARQ-ACK is $q_0^{ACK}, q_1^{ACK}, q_2^{ACK}, \ldots, q_{Q_{CDI}-1}^{ACK}$. The dividing unit 9131 of the combining submodule 913 is specifically configured to divide the coded bit sequence of the periodic CSI into a first part of the coded bit sequence $$q_0^{CSI}, q_1^{CSI}, q_2^{CSI}, \ldots, q_{\left(12-\left\lceil\frac{(Q_{ACK}/2)}{2}\right\rceil\right)*2-1}^{CSI}$$

of the CSI and a second part of the coded bit sequence $$q_{\left(12-\left\lceil\frac{(Q_{ACK}/2)}{2}\right\rceil\right)*2}^{CSI}, q_{\left(12-\left\lceil\frac{(Q_{ACK}/2)}{2}\right\rceil\right)*2+1}^{CSI}, \ldots, q_{Q_{CSI}-1}^{CSI}$$

of the CSI, and divide the coded bit sequence of the HARQ-ACK into a first part of the coded bit sequence $$q_0^{ACK}, q_1^{ACK}, q_2^{ACK}, \ldots, q_{\left\lceil\frac{(Q_{ACK}/2)}{2}\right\rceil*2-1}^{ACK}$$

of the HARQ-ACK and a second part of the coded bit sequence $$q_{\left\lceil\frac{(Q_{ACK}/2)}{2}\right\rceil*2}^{ACK}, q_{\left\lceil\frac{(Q_{ACK}/2)}{2}\right\rceil*2+1}^{ACK}, \ldots, q_{Q_{ACK}-1}^{ACK}$$

of the HARQ-ACK.

Furthermore, the first part of the coded bit sequence of the HARQ-ACK, which is divided by the dividing unit 9131, includes $$\left\lceil \frac{(Q_{ACK}/2)}{2} \right\rceil * 2$$

coded bits and the second part of the coded bit sequence of the HARQ-ACK includes $$\left\lfloor \frac{(Q_{ACK}/2)}{2} \right\rfloor *2 \text{ or } Q_{ACK} - \left\lceil \frac{(Q_{ACK}/2)}{2} \right\rceil *2$$

coded bits; the first part of the coded bit sequence of the CSI, which is divided by the dividing unit 9131, includes $$\left(12 - \left\lceil \frac{(Q_{ACK}/2)}{2} \right\rceil\right) *2 \text{ or } \left(\left\lfloor \frac{(Q_{CSI}/2)}{2} \right\rfloor\right) *2$$

coded bits and the second part of the coded bit sequence of the CSI includes $$\left(12 - \left\lfloor \frac{(Q_{ACK}/2)}{2} \right\rfloor\right) *2 \text{ or } Q_{CSI} - \left(\left\lfloor \frac{(Q_{CSI}/2)}{2} \right\rfloor\right) *2$$

coded bits.

Optionally, the first uplink control information is periodic channel state information CSI, a coded bit sequence of the periodic CSI is $q_0^{CSI}, q_1^{CSI}, q_2^{CSI}, \ldots, q_{Q_{CDI}-1}^{CSI}$, the second uplink control information is hybrid automatic repeat acknowledgment information HARQ-ACK, and a coded bit sequence of the HARQ-ACK is $q_0^{CSI}, q_1^{CSI}, q_2^{CSI}, \ldots, q_{Q_{CDI}-1}^{CSI}$.

The dividing unit 9131 is specifically configured to divide the coded bit sequence of the periodic CSI into a first part of the coded bit sequence $$q_0^{CSI}, q_1^{CSI}, q_2^{CSI}, \ldots, q_{\left(12 - \left\lceil \frac{(Q_{ACK}/2)}{4} \right\rceil *2\right)*Q_m - 1}^{CSI}$$

of the CSI and a second part of the coded bit sequence $$q_{\left(12 - \left\lceil \frac{(Q_{ACK}/2)}{4} \right\rceil *2\right)*Q_m}^{CSI}, q_{\left(12 - \left\lceil \frac{(Q_{ACK}/2)}{4} \right\rceil *2\right)*Q_m + 1}^{CSI}, \ldots, q_{Q_{CSI}-1}^{CSI}$$

of the CSI, and divide the coded bit sequence of the HARQ-ACK into a first part of the coded bit sequence $$q_0^{ACK}, q_1^{ACK}, q_2^{ACK}, \ldots, q_{\left\lceil \frac{(Q_{ACK}/2)}{4} \right\rceil *2*Q_m - 1}^{ACK}$$

of the HARQ-ACK and a second part of the coded bit sequence $$q_{\left\lceil \frac{(Q_{ACK}/2)}{4} \right\rceil *2*Q_m}^{ACK}, q_{\left\lceil \frac{(Q_{ACK}/2)}{4} \right\rceil *2*Q_m + 1}^{ACK}, \ldots, q_{Q_{ACK}-1}^{ACK}$$

of the HARQ-ACK.

Where, the first part of the coded bit sequence of the HARQ-ACK, which is divided by the dividing unit 9131, includes $$\left\lceil \frac{(Q_{ACK}/2)}{4} \right\rceil *2*Q_m$$

coded bits and the second part of the coded bit sequence of the HARQ-ACK includes $$\left((Q_{ACK}/2) - \left\lceil \frac{(Q_{ACK}/2)}{4} \right\rceil *2\right)*Q_m$$

coded bits; the first part of the coded bit sequence of the CSI, which is divided by the dividing unit 9131, includes $$\left(12 - \left\lceil \frac{(Q_{ACK}/2)}{4} \right\rceil *2\right)*Q_m \text{ or } \left\lfloor \frac{(Q_{CSI}/2)}{4} \right\rfloor *2*Q_m$$

coded bits and the second part of the coded bit sequence of the CSI includes $$\left(12 - \left((Q_{ACK}/2) - \left\lceil \frac{(Q_{ACK}/2)}{4} \right\rceil *2\right)\right)*Q_m,$$

$$Q_{CSI} - \left(12 - \left\lceil \frac{(Q_{ACK}/2)}{4} \right\rceil *2\right)*Q_m, \text{ or } Q_{CSI} - \left\lfloor \frac{(Q_{CSI}/2)}{4} \right\rfloor *2*Q_m$$

coded bits.

Figure 14:
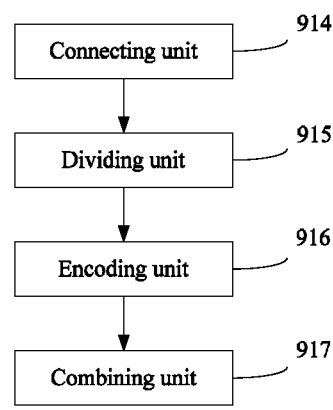
FIG. 14 is a schematic structural diagram of another encoding module according to Embodiment 6 of the present invention.

Optionally, with reference to relevant descriptions of encoding mode 2 of step 601 in Embodiment 4, as shown in FIG. 14, the encoding module 91 specifically includes:

a connecting unit 914, configured to attach an information bit sequence of the second uplink control information to the end of an information bit sequence of the first uplink control information to acquire an information bit sequence of the uplink control information, or attach an information bit sequence of the first uplink control information to the end of an information bit sequence of the second uplink control information to acquire an information bit sequence of the uplink control information;

a dividing unit 915, configured to divide the information bit sequence, which is acquired by the connecting unit 914, of the uplink control information into two parts;

an encoding unit 916, configured to use a (32, O) code to encode each part of the information bit sequence, which is divided by the dividing unit 915, of the uplink control information to acquire a 32-bit coded bit sequence, perform cyclic rate matching on each 32-bit coded bit sequence, and match a rate of a first 32-bit coded bit sequence to 24 bits and a rate of a second 32-bit coded bit sequence to 24 bits; and a combining unit 917, configured to combine the two rate-matched coded bit sequences acquired by the encoding unit 916 to acquire the coded bit sequence of the uplink control information.

The combining unit 917 is specifically configured to first divide each rate-matched coded bit sequence into two parts to acquire four coded bit sequences, where each coded bit sequence includes 12 coded bits, and then concatenate the four coded bit sequences in sequence;

or the combining unit 917 is specifically configured to alternately select, based on a granularity of coded bits whose quantity is equal to a modulation order of the uplink control information, coded bits from the two rate-matched coded bit sequences to acquire a 48-bit coded bit sequence, divide the 48-bit coded bit sequence into four parts, and concatenate the four parts in sequence to acquire the coded bit sequence of the uplink control information.

Optionally, with reference to relevant descriptions of normal cyclic prefix scenario 1 in step 801 in the foregoing Embodiment 5, when one PDSCH transmission transmitted on a primary carrier is received and neither a PDCCH corresponding to the PDSCH transmission nor a PDCCH that is used to indicate release of downlink SPS is detected, the encoding module 91 is specifically configured to use a (32, O) code to encode first uplink control information to acquire a coded bit sequence of the first uplink control information, and attach a bit $a''_0$ and a bit $a''_1$ to the end of the acquired coded bit sequence of the first uplink control information to acquire a coded bit sequence of uplink control information, where $a''_0$ is a 1-bit hybrid automatic repeat acknowledgment information bit corresponding to the received PDSCH and $a''_1$ is a NACK.

Optionally, with reference to relevant descriptions of extended cyclic prefix scenario 1 in step 801 in the foregoing Embodiment 5, when one PDSCH transmission transmitted on a primary carrier is received and neither a PDCCH corresponding to the PDSCH transmission nor a PDCCH that is used to indicate release of downlink SPS is detected, the transmitting module 92 is specifically configured to transmit, based on physical uplink control channel format 2b, the coded bit sequence, which is acquired by the encoding module, of the uplink control information to a base station through a physical uplink control channel.

Optionally, with reference to relevant descriptions of extended cyclic prefix scenario 3 in step 801 in the foregoing Embodiment 5, when only one PDSCH transmission transmitted on a primary carrier is received but no PDCCH corresponding to the PDSCH transmission is detected, and a PDCCH that is used to indicate release of downlink SPS is detected and a value of a DAI in the PDCCH is 1, the encoding module 91 is specifically configured to attach bits $a''_0$ and $a''_1$ to the end of an information bit sequence $a'_0, a'_1, a'_2, a'_3, \ldots, a'_{A'-1}$ of first uplink control information to acquire an information bit sequence $a_0, a_1, a_2, a_3, \ldots, a_{A-1}$ of uplink control information, where $a_{A'}=a''_0$, $a_{(A'+1)}=a''_1$, A' is the number of information bits of the first uplink control information, A=A'+2, $a''_0$ is a 1-bit hybrid automatic repeat acknowledgment information bit corresponding to the received PDSCH, and $a''_1$ is a 1-bit hybrid automatic repeat acknowledgment information bit corresponding to the detected PDCCH that is used to indicate release of downlink SPS; and use a (32, O) to encode the acquired information bit sequence of the uplink control information to acquire a coded bit sequence of the uplink control information.

Optionally, with reference to relevant descriptions of extended cyclic prefix scenario 4 in step 801 in the foregoing Embodiment 5, when only one PDSCH transmission transmitted on a primary carrier is received but no PDCCH corresponding to the PDSCH transmission is detected, and another PDSCH transmission transmitted on the primary carrier is also received and a value of a DAI in a PDCCH corresponding to the PDSCH is 1, the encoding module 91 is specifically configured to attach bits $a''_0$ and $a''_1$ to the end of an information bit sequence $a'_0, a'_1, a'_2, a'_3, \ldots, a'_{A'-1}$ of first uplink control information to acquire an information bit sequence $a_0, a_1, a_2, a_3, \ldots, a_{A-1}$ of uplink control information, where $a_{A'}=a''_0$, $a_{(A'+1)}=a''_1$, A' is the number of information bits of the first uplink control information, A=A'+2, $a''_0$ is a 1-bit hybrid automatic repeat acknowledgment information bit corresponding to the received PDSCH that has no corresponding PDCCH, and $a''_1$ is a 1-bit hybrid automatic repeat acknowledgment information bit corresponding to the PDSCH with the corresponding PDCCH detected; and use a (32, O) to encode the acquired information bit sequence of the uplink control information to acquire a coded bit sequence of the uplink control information.

Optionally, with reference to relevant description of step 302 in the foregoing Embodiment 2, the transmitting module 92 is specifically configured to scramble and modulate coded bits in the coded bit sequence of the uplink control information to acquire a group of complex-valued modulation symbols, use an orthogonal sequence to perform spectrum spreading on the acquired complex-valued modulation symbols to acquire spectrum-spread complex-valued modulation symbols, and map the spectrum-spread complex-valued modulation symbols to a physical uplink control channel for transmission to a base station.

Figure 15:
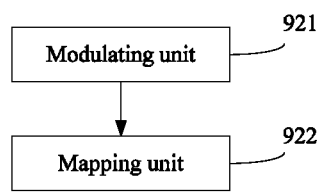
FIG. 15 is a schematic structural diagram of a transmitting module according to Embodiment 6 of the present invention.

Optionally, with reference to relevant descriptions of step 302 in the foregoing Embodiment 2, as shown in FIG. 15, the transmitting module 92 specifically includes:

a modulating unit 921, configured to scramble and modulate coded bits in the coded bit sequence of the uplink control information to acquire a group of complex-valued modulation symbols; and a mapping unit 922, configured to map the group of complex-valued modulation symbols acquired by the modulating unit 921 to a physical uplink control channel for transmission to a base station, so that, in the group of complex-valued modulation symbols, complex-valued modulation symbols in even positions and complex-valued modulation symbols in odd positions are respectively mapped to time and frequency resources of two timeslots on the physical uplink control channel for transmission to the base station.

The mapping unit 922 is specifically configured to extract, from the acquired complex-valued modulation symbols, the complex-valued modulation symbols in even positions and the complex-valued modulation symbols in odd positions and attach the complex-valued modulation symbols in odd positions to the end of the complex-valued modulation symbols in even positions to acquire an interleaved group of complex-valued modulation symbols; and map the interleaved group of complex-valued modulation symbols to the physical uplink channel for transmission to the base station;

the mapping unit 922 is specifically configured to use an orthogonal sequence of a first timeslot to perform spectrum spreading on the complex-valued modulation symbols in even positions in the acquired complex-valued symbols and map the spectrum-spread complex-valued symbols to time and frequency resources of the first timeslot on the physical uplink control channel for transmission to the base station; and use an orthogonal sequence of a second timeslot to perform spectrum spreading on the complex-valued modulation symbols in odd positions in the acquired complex-valued symbols and map the spectrum-spread complex-valued symbols to time and frequency resources of the second timeslot on the physical uplink control channel for transmission to the base station.

By encoding uplink control information to acquire a coded bit sequence of the uplink control information and transmitting, through a physical uplink channel, the coded bit sequence to a base station, the user equipment provided by the embodiment supports simultaneous transmission of first uplink control information and second uplink control information, which improves transmission performance.

Embodiment 7

Figure 16:
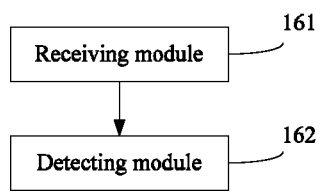
FIG. 16 is a schematic structural diagram of a base station according to Embodiment 7 of the present invention.
Figure 17:
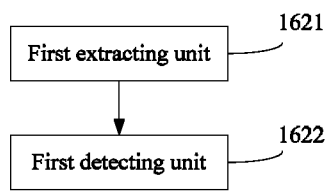
FIG. 17 is a schematic structural diagram of a detecting module according to Embodiment 7 of the present invention.

The embodiment provides a base station. The base station is configured to execute methods that are executed by the base station in the foregoing embodiments 1 to 5. As shown in FIG. 16, the base station includes:

a receiving module 161, configured to receive a signal transmitted on a physical uplink channel, where the physical uplink channel is used to transmit uplink control information, where the uplink control information includes first uplink control information and second uplink control information; and a detecting module 162, configured to detect, according to the signal that is transmitted on the physical uplink channel and is received by the receiving module 161, the uplink control information.

It should be noted that, for specific descriptions of the receiving module 161 and the detecting module 162 in the embodiment of the present invention, reference may be made to relevant descriptions of steps 303 and 304 in the foregoing Embodiment 2, and details are not described herein again.

As shown in FIG. 16, the detecting module 162 specifically includes:

a first extracting unit 1621, configured to extract, according to a mechanism for acquiring a coded bit sequence of the uplink control information, a signal corresponding to the first uplink control information and a signal corresponding to the second uplink control information from the signal transmitted on the physical uplink channel; and a first detecting unit 1622, configured to detect, according to the signal that corresponds to the first uplink control information and is extracted by the first extracting unit 1621, the first uplink control information, and detect, according to the information that corresponds to the second uplink control information and is extracted by the first extracting unit 1621, the second uplink control information.

The mechanism for acquiring the coded bit sequence of the uplink control information is specifically as follows:

encoding the first uplink control information to acquire a coded bit sequence of the first uplink control information and encoding the second uplink control information to acquire a coded bit sequence of the second uplink control information; and combining the coded bit sequence of the first uplink control information and the coded bit sequence of the second uplink control information to acquire the coded bit sequence of the uplink control information.

Furthermore, the combining the coded bit sequence of the first uplink control information and the coded bit sequence of the second uplink control information to acquire the coded bit sequence of the uplink control information may be specially as follows:

dividing the coded bit sequence of the first uplink control information into a first part of the coded bit sequence of the first uplink control information and a second part of the coded bit sequence of the first uplink control information, and dividing the coded bit sequence of the second uplink control information into a first part of the coded bit sequence of the second uplink control information and a second part of the coded bit sequence of the second uplink control information; and concatenating the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information.

Figure 18:
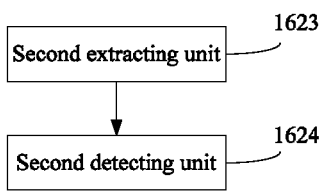
FIG. 18 is a schematic structural diagram of another detecting module according to Embodiment 7 of the present invention.

As shown in FIG. 18, the detecting module 162 specifically includes:

a second extracting unit 1623, configured to extract, according to the mechanism for acquiring the coded bit sequence of the uplink control information and a mechanism for mapping the coded bit sequence of the uplink control information to a physical uplink control channel, information corresponding to the first uplink control information and information corresponding to the second uplink control information from the uplink control information transmitted on the physical uplink channel; and a second detecting unit 1624, configured to detect, according to the information that corresponds to the first uplink control information and is extracted by the second extracting unit 1623, the first uplink control information, and detect, according to the information that corresponds to the second uplink control information and is extracted by the second extracting unit 1623, the second uplink control information.

The mechanism for acquiring the coded bit sequence of the uplink control information is specifically as follows: concatenating the coded bit sequence of the second uplink control information and the coded bit sequence of the first uplink control information to acquire the coded bit sequence of the uplink control information.

The mechanism for mapping the coded bit sequence of the uplink control information to the physical uplink control channel is specifically as follows: interleaving acquired complex-valued modulation symbols so that, in the interleaved complex-valued modulation symbols, complex-valued modulation symbols in even positions are arranged in front of complex-valued modulation symbols in odd positions; and mapping the interleaved complex-valued modulation symbols to the physical uplink channel.

The second extracting unit 1623 is specifically configured to determine, according to the mechanism for acquiring the coded bit sequence of the uplink control information and the mechanism for mapping the coded bit sequence of the uplink control information to the physical uplink control channel, positions of the first uplink control information and the second uplink control information on time and frequency resources of the physical uplink channel, and extract, according to the determined positions, the information corresponding to the first uplink control information and the information corresponding to the second uplink control information.

Optionally, the detecting module 162 is specifically configured to detect, based on physical uplink control channel format 2b, the uplink control information according to the information transmitted on the physical uplink channel when only one PDSCH transmission is transmitted to a user equipment on a primary carrier and neither a PDCCH corresponding to the PDSCH nor a PDCCH that is used to indicate release of downlink SPS is sent to the user equipment on a current subframe.

By encoding uplink control information to acquire a coded bit sequence of the uplink control information and transmitting, through a physical uplink channel, the coded bit sequence to a base station, the base station provided by the embodiment supports simultaneous transmission of first uplink control information and second uplink control information and improves transmission performance.

Embodiment 8

Figure 19:
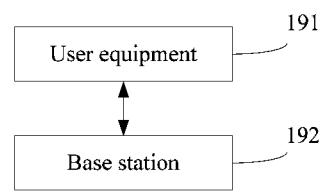
FIG. 19 is a schematic structural diagram of a system for transmitting uplink control information according to Embodiment 8 of the present invention.

The embodiment provides a system for transmitting uplink control information. As shown in FIG. 19, the system includes a user equipment 191 and a base station 192.

The user equipment 191 is the user equipment provided by the foregoing Embodiment 6. For details, see the foregoing Embodiment 6.

The base station 192 is the base station provided by the foregoing Embodiment 7. For details, see the foregoing Embodiment 7.

In the system provided by the embodiment, a user equipment encodes uplink control information to acquire a coded bit sequence of the uplink control information and transmits, through a physical uplink channel, the coded bit sequence to a base station, thereby supporting simultaneous transmission of first uplink control information and second uplink control information and improving transmission performance.

It should be noted that, when the user equipment and the base station in the forgoing embodiments transmit the uplink control information, the divisions of the foregoing functional modules are used as mere examples, and in actual applications, the forgoing functions may be completed by different functional modules as required, that is, an internal structure of a device is divided into different functional modules to complete all or a part of the foregoing described functions. In addition, the user equipment, the base station, and the method for transmitting uplink control information in the foregoing embodiments are based on a same idea, and the method embodiments may be referenced for their specific implementation processes which are not described herein again.

A person of ordinary skill in the art can understand that all or a part of the steps of the embodiments may be implemented by hardware or a program instructing relevant hardware. The program may be stored in a computer readable storage medium. The storage medium may include: a read-only memory, a magnetic disc, or an optical disc.

The preceding embodiments are merely exemplary embodiments of the present invention and are not intended to limit the present invention. All modifications, equivalent replacements and improvements made without departing from the spirit and principle of the present invention shall fall within the protection scope of the present invention.

What is claimed is:

1. A method for transmitting uplink control information, comprising:
   receiving a signal transmitted on a physical uplink channel, wherein the physical uplink channel is used to transmit uplink control information, wherein the uplink control information comprises first uplink control information and second uplink control information; and
   detecting, according to the signal transmitted on the physical uplink channel, the uplink control information wherein the detecting includes extracting, according to a mechanism for acquiring a coded bit sequence of the uplink control information, a signal corresponding to the first uplink control information and a signal corresponding to the second uplink control information from the signal transmitted on the physical uplink channel by:
      encoding the first uplink control information to acquire a coded bit sequence of the first uplink control information and encoding the second uplink control information to acquire a coded bit sequence of the second uplink control information; and
      combining the coded bit sequence of the first uplink control information and the coded bit sequence of the second uplink control information to acquire the coded bit sequence of the uplink control information, wherein the combining comprises:
         dividing the coded bit sequence of the first uplink control information into a first part of the coded bit sequence of the first uplink control information and a second part of the coded bit sequence of the first uplink control information, and dividing the coded bit sequence of the second uplink control information into a first part of the coded bit sequence of the second uplink control information and a second part of the coded bit sequence of the second uplink control information; and
         concatenating the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information; and
   detecting, according to the signal corresponding to the first uplink control information, the first uplink control information and detecting, according to the signal corresponding to the second uplink control information, the second uplink control information.

2. A base station, comprising:
   a receiving module, configured to receive a signal transmitted on a physical uplink channel, wherein the physical uplink channel is used to transmit uplink control information, wherein the uplink control information comprises first uplink control information and second uplink control information; and
   a detecting module, configured to detect, according to the signal transmitted on the physical uplink channel, the uplink control information, wherein the detecting module comprises:
   a first extracting unit, configured to extract, according to a mechanism for acquiring a coded bit sequence of the uplink control information, a signal corresponding to the first uplink control information and a signal corresponding to the second uplink control information from the signal transmitted on the physical uplink channel, wherein the mechanism for acquiring the coded bit sequence of the uplink control information includes:
      encoding the first uplink control information to acquire a coded bit sequence of the first uplink control information and encoding the second uplink control information to acquire a coded bit sequence of the second uplink control information; and
      combining the coded bit sequence of the first uplink control information and the coded bit sequence of the second uplink control information to acquire the coded bit sequence of the uplink control information by:
         dividing the coded bit sequence of the first uplink control information into a first part of the coded bit sequence of the first uplink control information and a second part of the coded bit sequence of the first uplink control information, and dividing the coded bit sequence of the second uplink control information into a first part of the coded bit sequence of the second uplink control information and a second part of the coded bit sequence of the second uplink control information; and
         concatenating the first part of the coded bit sequence of the first uplink control information, the first part of the coded bit sequence of the second uplink control information, the second part of the coded bit sequence of the first uplink control information, and the second part of the coded bit sequence of the second uplink control information in sequence to acquire the coded bit sequence of the uplink control information; and a first detecting unit, configured to detect, according to the signal corresponding to the first uplink control information extracted by the first extracting unit, the first uplink control information, and detect, according to the signal corresponding to the second uplink control information extracted by the first extracting unit, the second uplink control information.

\* \* \* \* \*